(12) United States Patent
Sugawara

(10) Patent No.: US 11,698,715 B2
(45) Date of Patent: Jul. 11, 2023

(54) IMAGE DISPLAY SYSTEM AND PROGRAM

(71) Applicant: RADIUS5 Inc., Tokyo (JP)

(72) Inventor: Kenta Sugawara, Tokyo (JP)

(73) Assignee: RADIUS5 INC., Tokyo (JP)

( * ) Notice: Subject to any disclaimer, the term of this patent is extended or adjusted under 35 U.S.C. 154(b) by 4 days.

(21) Appl. No.: 17/622,110

(22) PCT Filed: Apr. 23, 2020

(86) PCT No.: PCT/JP2020/017414
§ 371 (c)(1),
(2) Date: Dec. 22, 2021

(87) PCT Pub. No.: WO2020/261739
PCT Pub. Date: Dec. 30, 2020

(65) Prior Publication Data
US 2022/0365636 A1    Nov. 17, 2022

(30) Foreign Application Priority Data

Jun. 26, 2019    (JP) ................................ 2019-118398

(51) Int. Cl.
*G06F 3/04847*    (2022.01)
*G06F 3/0482*    (2013.01)

(52) U.S. Cl.
CPC ........ *G06F 3/0482* (2013.01); *G06F 3/04847* (2013.01)

(58) Field of Classification Search
CPC ................................................. G06F 3/04847
USPC ....................................................... 715/810
See application file for complete search history.

(56) References Cited

U.S. PATENT DOCUMENTS

| | | | | |
|---|---|---|---|---|
| 5,893,095 A * | 4/1999 | Jain | ......................... | G06F 16/58 |
| 6,345,274 B1 * | 2/2002 | Zhu | ......................... | G06Q 10/02 |
| | | | | 707/999.005 |
| 8,380,005 B1 * | 2/2013 | Jonsson | .................. | G06T 11/60 |
| | | | | 382/284 |
| 8,949,253 B1 * | 2/2015 | Jing | ........................ | G06F 16/51 |
| | | | | 707/723 |
| 9,418,313 B2 * | 8/2016 | Valente | ................ | G06V 10/462 |
| 11,164,234 B2 * | 11/2021 | Kakinuma | .......... | G06Q 30/0631 |
| 11,335,069 B1 * | 5/2022 | Savchenkov | .......... | G06N 20/00 |

(Continued)

FOREIGN PATENT DOCUMENTS

| | | |
|---|---|---|
| JP | 2012083873 A | 4/2012 |
| JP | 201337390 A | 2/2013 |

OTHER PUBLICATIONS

Notice of Reasons for Refusal dated Jul. 18, 2019 for JP patent application No. 2019-118398.

(Continued)

*Primary Examiner* — Reza Nabi

(57) ABSTRACT

To obtain an image desired by a user by performing an intuitive operation.
An image display system includes a first display control unit that displays a reference image on a display surface, and a second display control unit that selectably displays a plurality of candidate images each having image information different from the reference image in the periphery of a display area of the reference image on the display surface, wherein each image data of the plurality of candidate images is included in a search area on a predetermined space determined based on the image data of the reference image.

16 Claims, 19 Drawing Sheets

(56) References Cited

U.S. PATENT DOCUMENTS

| | | | | |
|---|---|---|---|---|
| 2001/0053249 | A1* | 12/2001 | Krishnamachari | ........................ G06F 16/5838 382/165 |
| 2002/0178149 | A1* | 11/2002 | Chen | .................. G06F 16/5854 |
| 2003/0009454 | A1* | 1/2003 | Kim | ........................ G06F 16/54 |
| 2003/0231806 | A1* | 12/2003 | Troyanker | .......... G06F 16/5838 707/E17.03 |
| 2006/0072811 | A1* | 4/2006 | Porter | .................. G06V 40/161 382/103 |
| 2006/0072830 | A1* | 4/2006 | Nagarajan | ............ G06V 30/412 375/E7.2 |
| 2008/0062198 | A1* | 3/2008 | Takahashi | ............. A63F 13/533 345/630 |
| 2011/0193876 | A1* | 8/2011 | Handa | ..................... G06F 3/147 345/595 |
| 2012/0121189 | A1* | 5/2012 | Ishii | ........................ G06T 7/337 382/197 |
| 2013/0080287 | A1* | 3/2013 | Currie | ................ G06Q 30/0621 705/26.5 |
| 2013/0097181 | A1* | 4/2013 | Sud | ..................... G06F 16/5838 707/765 |
| 2013/0297648 | A1* | 11/2013 | Hotta | .................... G06F 16/532 707/769 |
| 2013/0342731 | A1* | 12/2013 | Lee | ........................ H04N 23/80 348/231.4 |
| 2014/0078093 | A1* | 3/2014 | Kawashita | ............ H04N 21/47 345/173 |
| 2014/0105468 | A1* | 4/2014 | Kawashita | ........... H04N 1/0044 382/118 |
| 2015/0186743 | A1* | 7/2015 | Kamos | ................... H04N 23/70 382/195 |
| 2017/0091908 | A1* | 3/2017 | Takeda | ...................... G06T 5/50 |
| 2017/0139923 | A1* | 5/2017 | Wang | ................. G06Q 30/0625 |
| 2019/0121879 | A1* | 4/2019 | Canelis | ................ G06F 16/9535 |
| 2019/0325616 | A1* | 10/2019 | Chhaya | ................. G06V 40/167 |
| 2019/0340419 | A1* | 11/2019 | Milman | .................. G06T 13/80 |
| 2020/0082212 | A1* | 3/2020 | Alcock | ................. G06F 18/232 |
| 2020/0150832 | A1* | 5/2020 | Winn | ............... A61K 39/39566 |
| 2020/0236301 | A1* | 7/2020 | Shaburov | ............. G11B 27/031 |
| 2021/0042558 | A1* | 2/2021 | Choi | ......................... G06T 5/50 |
| 2021/0089570 | A1* | 3/2021 | Hunter | .................... G06F 18/21 |
| 2021/0124774 | A1* | 4/2021 | Bedi | ........................ G06V 20/20 |
| 2021/0166058 | A1* | 6/2021 | Miao | ...................... G06N 3/045 |
| 2021/0191971 | A1* | 6/2021 | Ko | ......................... G06F 16/532 |
| 2021/0233140 | A1* | 7/2021 | Aggarwal | .............. G06V 10/25 |
| 2021/0263963 | A1* | 8/2021 | Cho | ......................... G06F 16/55 |
| 2021/0279938 | A1* | 9/2021 | Chandran | ................ G06T 17/00 |
| 2021/0294834 | A1* | 9/2021 | Mai | ......................... G06N 3/084 |
| 2021/0358190 | A1* | 11/2021 | Choi | ...................... G06T 19/20 |
| 2022/0091706 | A1* | 3/2022 | Winn | ...................... G06F 16/54 |
| 2022/0179899 | A1* | 6/2022 | Dong | ................... G06F 16/583 |
| 2022/0207808 | A1* | 6/2022 | Saa-Garriga | ............ G06T 11/00 |
| 2022/0245391 | A1* | 8/2022 | Badjatiya | ............... G06N 3/044 |
| 2022/0253126 | A1* | 8/2022 | Hollan | ..................... G06F 3/011 |
| 2022/0365636 | A1* | 11/2022 | Sugawara | ............. G06F 3/0484 |

OTHER PUBLICATIONS

Goodfellow et al., "Generative Adversarial Nets" NIPS'14: Proceedings of the 27th International Conference on Neural Information Processing Systems, Dec. 8, 2014, pp. 1-9.

Jin et al. "Towards the Automatic Anime Characters Creation with Generative Adversarial Networks" Computer Science, Aug. 18, 2017, pp. 1-16, https://arxiv.org/abs/1708.05509.

* cited by examiner

IMAGE DISPLAY SYSTEM AND PROGRAM

TECHNICAL FIELD

The present disclosure relates to an image display system and a program.

BACKGROUND ART

Recently, a technique for automatically generating images using AI (Artificial Intelligence) has been developed. For example, Non-Patent Document 1 below discloses a technique for automatically generating illustrations of people using an algorithm called GAN (Generative Adversarial Networks).

Non-Patent Document 2 discloses an automatic image generation technique specialized for anime characters and an interface for generating anime characters according to a user's preference.

PRIOR ART

Patent Document

[Non-Patent Document 1] Jan J. Goodfellow, Jean Pouget-Abadie, Mehdi Mirza, Bing Xu, David Warde-Farley, Sherjil Ozair, Aaron Courville, Yoshua Bengio, "Generative Adversarial Nets" In NIPS 2014.

[Non-Patent Document 2] Yanghua Jin, Jiakai Zhang, Minjun Li, Yingtao Tian, Huachun Zhu, Zhihao Fang, "Towards the Automatic Anime Characters Creation with Generative Adversarial Networks" eprint arXiv, https://arxivorg/abs/17080.05509

SUMMARY OF THE INVENTION

Technical Problem

However, in the technique disclosed in Non-Patent Document 2, since abstract parameters are used as input values for automatic image generation, many trials are required for a user in order to automatically generate the image desired by the user, which is a heavy burden on the user.

The present disclosure has been made in view of such problems, and an object of the present disclosure is to provide an image display system and a program capable of obtaining an image as desired by a user by intuitive operation.

Technical Solution

According to the present disclosure, there is provided an image display system comprising: a first display control unit that displays a reference image on the display surface, and a second display control unit that selectably displays a plurality of candidate images each having image information different from the reference image in the periphery of the display area of the reference image on the display surface, wherein each image data of the plurality of candidate images is included in a search area on a predetermined space determined based on the image data of the reference image.

Also, according to the present disclosure, there is provided a program which makes a computer operates as: a first display control means for displaying a reference image on the display surface, and a second display control means for selectably displaying a plurality of candidate images each having image information different from the reference image in the periphery of the display area of the reference image on the display surface, wherein each image data of the plurality of candidate images is included in a search area on a predetermined space determined based on the image data of the reference image.

Other problems disclosed in the present application and technical solutions thereof will be clarified in the embodiments of the invention and the accompanying figures.

Advantageous Effects

According to the present disclosure, an image desired by a user can be obtained by performing intuitive operations.

DETAILED DESCRIPTION OF THE EMBODIMENTS

Figure 1:
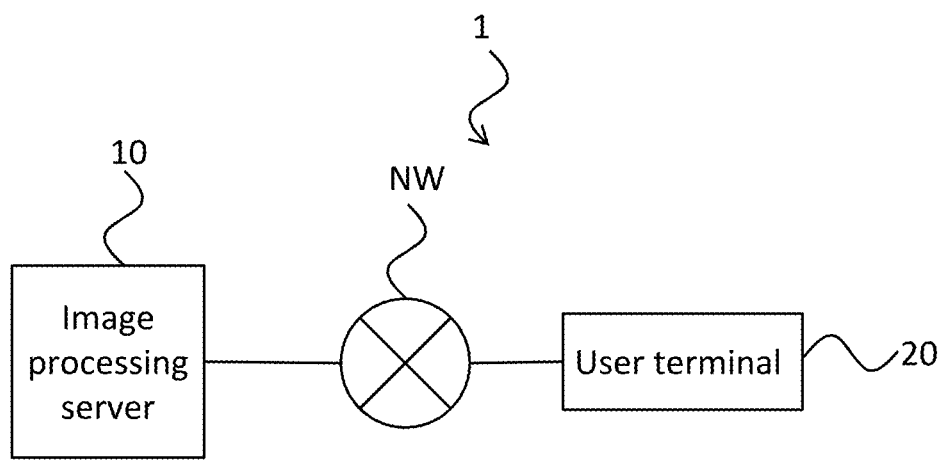
FIG. 1 is a diagram showing an overall configuration example of an image display system according to an embodiment of the present disclosure.

The contents of the embodiment of the present disclosure will be listed and described. The image processing apparatus and program according to one embodiment of the present disclosure have the following configurations.

[Item 1]
An image display system comprising:
a first display control unit that displays a reference image on a display surface; and
a second display control unit that selectably displays a plurality of candidate images, each having image information different from that of the reference image, in the periphery of the display area of the reference image on the display surface,
wherein each image data of the plurality of candidate images is included in a search area on a predetermined space determined based on the image data of the reference image.

[Item 2]
The image display system according to Item 1, wherein the first display control unit displays the selected one image as the reference image when a selection of one image among the plurality of candidate images displayed on the display surface is input.

[Item 3]
The image display system according to Item 2, wherein the first display control unit displays the selected one image as the reference image in the area where the reference image is displayed.

[Item 4]
The image display system according to Item 3, wherein input of selection of one image among the plurality of candidate images is an input based on a movement of an operation body on the display surface toward an area where the reference image of the one image is displayed.

[Item 5]
The image display system as in one of Items 1 to 4, wherein the search area is set based on the distance between the image data of the reference image and the image data of the image previously selected as the reference image.

[Item 6]
The image display system according to Item 5, wherein the search area is set based on the distance between the image data of the reference image and the image data of a plurality of images previously selected as the reference image.

[Item 7]
The image display system as in one of Items 1 to 6, wherein the search area is set based on a distribution on the predetermined space of image data of the plurality of images previously selected as the reference image.

[Item 8]
The image display system according to Item 7, wherein the search area is set based on a transition on the predetermined space of image data of the plurality of images previously selected as the reference image.

[Item 9]
The image display system as in one of Items 1 to 8, wherein the search area is set based on an operation to a mapping screen of image data of an image group on the predetermined space displayed on the display surface.

[Item 10]
The image display system as in one of Items 1 to 9, wherein the predetermined space is a space obtained by subjecting the coordinate space of the image data of the image to a dimension reduction processing or a dimensionality adjustment processing.

[Item 11]
The image display system as in one of Items 1 to 10, wherein the image data is obtained by vectorizing the image.

[Item 12]
The image display system as in one of Items 1 to 11, wherein the second display control unit controls the display mode of each of the plurality of candidate images on the display surface based on the distance between the reference image and each of the plurality of candidate images in a predetermined space.

[Item 13]
The image display system according to Item 12, wherein the second display control unit determines the display position of each of the plurality of candidate images on the display surface based on the distance between the reference image and each of the plurality of candidate images in the predetermined space.

[Item 14]
The image display system according to Item 13, wherein the second display control unit determines the distance between each of the plurality of candidate images and the reference image on the display surface based on the distance between the reference image and each of the plurality of candidate images in the predetermined space.

[Item 15]
The image display system as in one of Items 12 to 14, wherein the second display control unit controls the display size of each of the plurality of candidate images on the display surface based on the distance between the reference image and each of the plurality of candidate images in a predetermined space.

[Item 16]
The image display system as one of Items 1 to 15, wherein the second display control unit displays the candidate image selected from the selection object group having a size set according to the processing status of the image display system in the search area.

[Item 17]
The image display system according to Item 16, wherein the size of the selection object group for the search area increases or decreases as the processing of the image display system progresses.

[Item 18]
The image display system as in one of Items 1 to 17, wherein the second display control unit displays the plurality of candidate images having image data included in a new search area based on the input to an area change object that changes the size of the search range displayed on the display surface.

[Item 19]
A program which makes a computer operates as:
a first display control means for displaying a reference image on a display surface; and
a second display control means for selectably displaying a plurality of candidate images, each having image information different from that of the reference image, in the periphery of the display area of the reference image on the display surface,
wherein each image data of the plurality of candidate images is included in a search area on a predetermined space determined based on the image data of the reference image.

Hereinbelow, an embodiment of the present disclosure will be described with reference to the accompanying drawings.

FIG. 1 is a diagram showing an overall configuration example of an image display system according to an embodiment of the present disclosure. The image display system 1 of the present embodiment is configured to include an image processing server 10. The image processing server 10 is communicably connected to one or more user terminals 20 via a communication network NW. The communication network NW is, for example, the Internet, and is constructed by a public telephone line network, a mobile phone line network, a wireless communication path, Ethernet (registered trademark), or the like.

The image display system 1 of the present embodiment is intended to provide a service to one or more users for automatically generating a desired image of the user based on an image selected according to the operation of the user. In the image display system 1 of the present embodiment, for example, the image processing server 10 transmits a plurality of images to the user terminal 20, a user operates the user terminal 20 to select at least one image from the plurality of images, and the image processing server 10 automatically generates at least one image based on such selection. The image processing server 10 transmits the automatically generated image to the user terminal 20, and the user operates the user terminal 20 again to select one image. By repeating the above processing, the user can obtain an image that most closely matches the user's own intention simply by intuitively selecting his or her desired image. Further, the image display system 1 may provide a service in which an image prepared or generated in advance is stored in a predetermined storage or the like, and an image close to the user's request is presented to the user in response to the user's operation. In such a case, for example, the calculation cost required for the image processing server 10 can be reduced, or the latency can be reduced.

The image processing server 10 is a computer that performs a process of automatically generating an image desired by the user based on the image selected according to the operation of the user on the user terminal 20. The image processing server 10 may be, for example, a personal computer, a workstation, or a virtual computer by cloud computing. The image processing server 10 is assumed to execute these functions as a so-called Web application. Further, in FIG. 1, the image processing server 10 is shown as a single server, but the image processing server 10 is not limited thereto. The image display system 1 may have a plurality of image processing servers including an image processing server 10, and can execute processing in the present system by distributed processing. Further, here, the increase/decrease in the number of image processing servers that perform distributed processing can be dynamically changed according to the load of each processing and/or the size and number of images to be processed. Further, the image processing server 10 may process image data on-line.

The user terminal 20 is a terminal device such as a mobile phone, a smartphone, a game machine, a tablet computer, or a personal computer.

The user terminal 20 transmits information about an image selected by the user among the images displayed on the display unit 26 to the image processing server 10, and receives an image generated based on the transmitted information from the image processing server 10. For example, application software, a Web browser, or the like corresponding to the image display system 1 according to the present embodiment may be installed in the user terminal 20.

Figure 2:
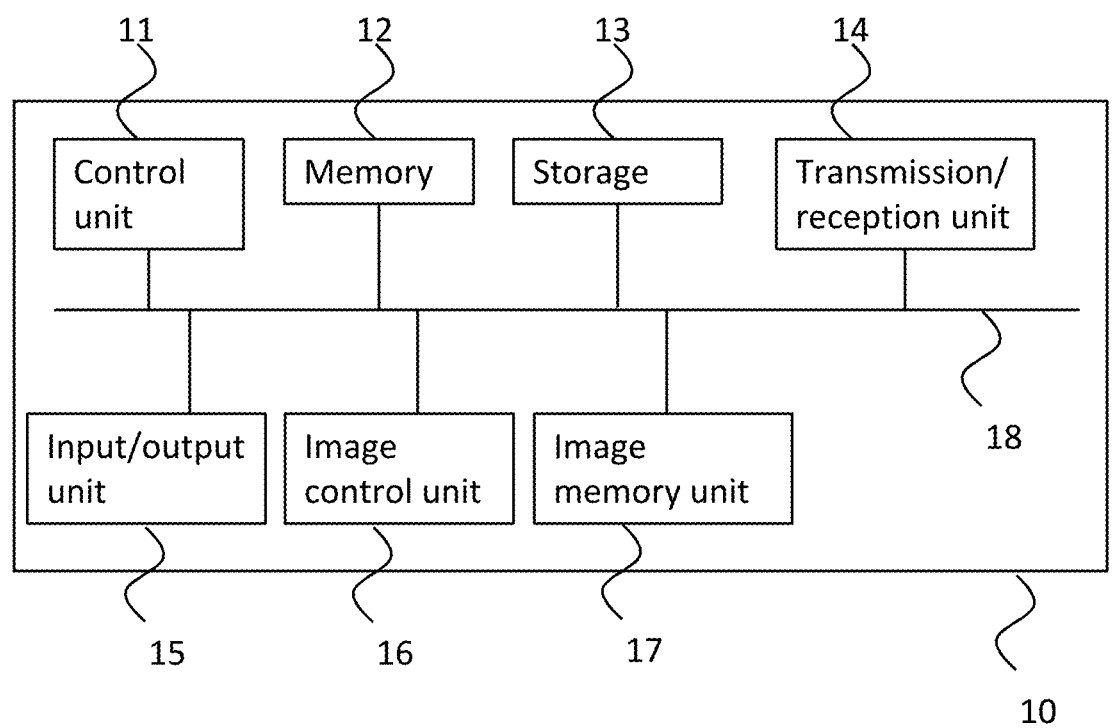
FIG. 2 is a diagram showing a hardware configuration example of an image processing server according to the present embodiment.

FIG. 2 is a diagram showing a hardware configuration example of the image processing server 10 according to the present embodiment. The image processing server 10 includes at least a control unit 11, a memory 12, a storage 13, a transmission/reception unit 14, an input/output unit 15, an image control unit 16, an image memory 17 and the like, and these are electrically connected to each other via a bus 18.

The control unit 11 is an arithmetic unit that controls the operation of the entire image processing server 1, controls the transmission and reception of data between elements, and performs information processing necessary for application execution, authentication processing, and the like. The control unit 11 is, for example, a CPU (Central Processing Unit), and executes each information processing by executing a program or the like stored in the storage 13 and deployed in the memory 11. Further, the control unit 11 has a function of controlling a search range of a candidate image described later.

The memory 12 includes a main memory composed of a volatile storage device such as a DRAM (Dynamic Random Access Memory) and an auxiliary storage composed of a non-volatile memory device such as a flash memory or an HDD (Hard Disk Drive). The memory 12 is used as a work area or the like of the control unit 11, and also stores a BIOS (Basic Input/Output System) executed at the start of the image processing server 10, various setting information, and the like.

The storage 13 stores various programs such as application programs or the like. A database (not shown) for storing data used for each processing may be constructed in the storage 13.

The transmission/reception unit 14 connects the image processing server 10 to the communication network NW. Further, the transmission/reception unit 14 may be provided with a short-range communication interface such as Bluetooth (registered trademark) or Wi-Fi (registered trademark). The transmission/reception unit 14 receives, for example, information related to an image selected from the user terminal 20, or transmit the image data automatically generated by the image processing server 10 to the user terminal 20. The input/output unit 15 is an information input device such as a keyboard, a mouse, a controller, and the like, and an output device such as a display and the like.

The image control unit 16 has a function of performing a process of automatically generating an image. The image control unit 16 is, for example, a GPU (Graphics Processing Unit), and can simultaneously perform parallel processing of instructions from a host CPU by a large number of cores. Further, the image control unit 16 can perform parallel processing simultaneously by an accelerator or an accelerator cluster. Examples of the accelerator may include, but are not limited to, CPU, GPU, FPGA, ASIC, an arithmetic core dedicated to a neural network of its own definition, an arithmetic unit using inference-only light, and the like. For the automatic image generation processing, for example, a known machine learning algorithm such as a Boltzmann machine, Encoder-Decoder, GAN, VAE (Variational Autoencoder), StyleTransfer, and the like may be used.

The image memory 17 is used to store the automatically generated image data. The image memory 17 is, for example, a VRAM (Video Random Access Memory). The bus 18 is commonly connected to each of the above elements and transmits, for example, an address signal, a data signal, and various control signals.

Figure 3:
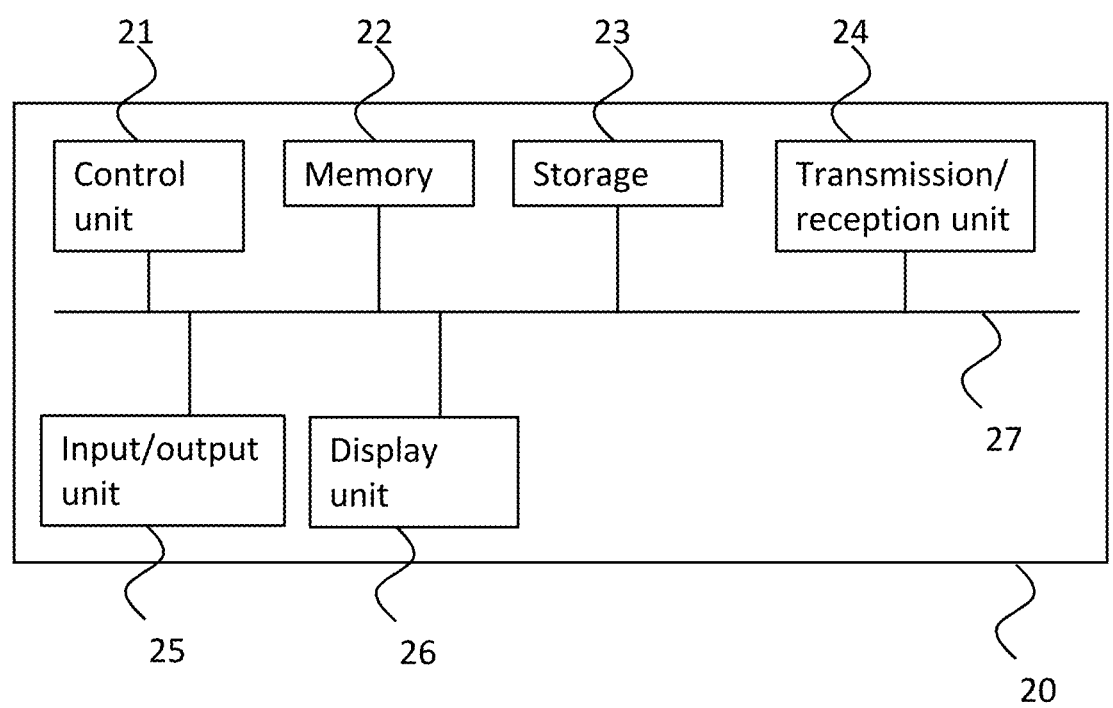
FIG. 3 is a diagram showing a hardware configuration example of a user terminal according to the present embodiment.

FIG. 3 is a diagram showing a hardware configuration example of the user terminal 20 according to the present embodiment. The user terminal 20 includes at least a control unit 21, a memory 22, a storage 23, a transmission/reception unit 24, an input/output unit 25, a display unit 26, and the like, and these are electrically connected to each other via a bus 27. Since each component of the control unit 21, the memory 22, the storage 23, the transmission/reception unit 24, and the input/output unit 25 has the same hardware function as each component of the image processing server 10 described above, the description thereof will be omitted.

The display unit 26 has a function of displaying various information. The display unit 26 may be realized, for example, by a display or the like. Further, the display unit 26 may be realized by being functionally integrated with the input/output unit 25 such as a touch panel. In the present embodiment, the display unit 26 will be described as being realized by a touch panel (that is, one having a function of accepting a user's operation).

Figure 4:
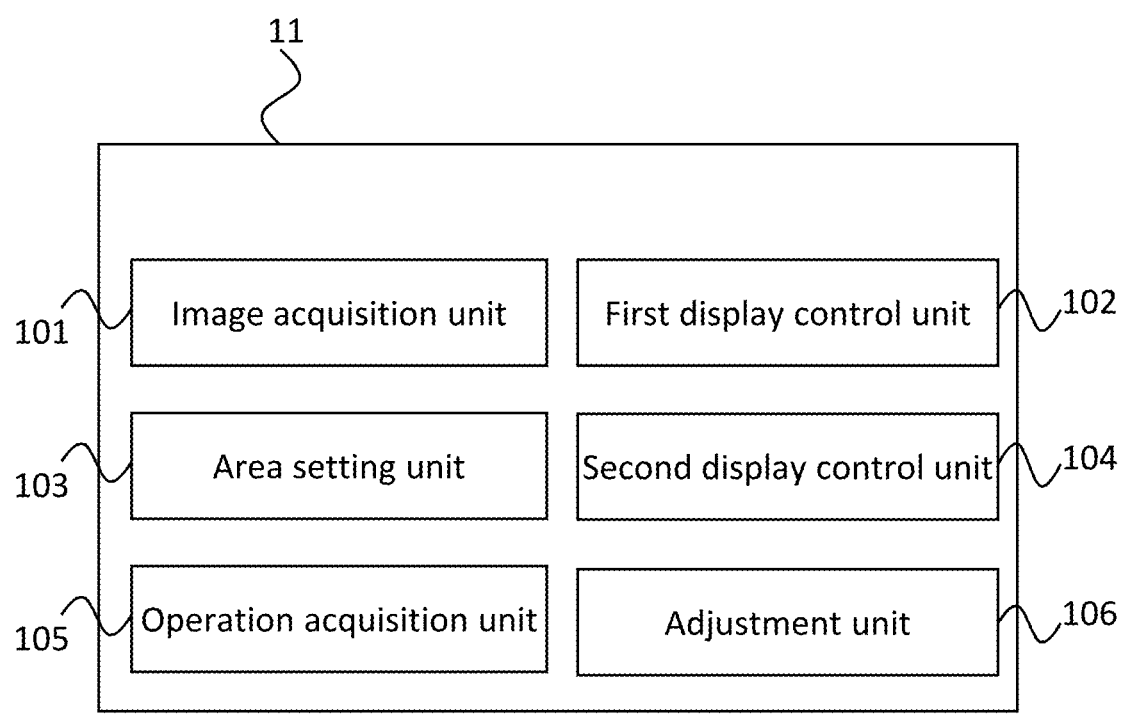
FIG. 4 is a diagram showing a functional configuration example of a control unit according to the present embodiment.

FIG. 4 is a diagram showing a functional configuration example of the control unit 11 according to the present embodiment. The control unit 11 includes an image acquisition unit 101, a first display control unit 102, an area setting unit 103, a second display control unit 104, an operation acquisition unit 105, and an adjustment unit 106.

Further, the image acquisition unit 101, the first display control unit 102, the area setting unit 103, the second display control unit 104, the operation acquisition unit 105, and the adjustment unit 106 are realized in such a manner that the control unit 11 or the image control unit 16 provided in the image processing server 10 reads the program stored in a storage 13 from a memory 12 or an image memory 17 and executes it. Further, regarding the processing executed in each unit, parallel processing can be performed by a plurality of devices in the image processing server 10 and/or another server according to the processing load and hardware resources.

The image acquisition unit 101 has a function of acquiring image data. For example, the image acquisition unit 101 acquires image data previously stored in the storage 13, and image data automatically generated by the image control unit 16 (which may be stored in the image memory 17). Further, the image acquisition unit 101 may acquire image data from external hardware such as the user terminal 20 through the input/output unit 15 and the like. Further, the image data herein is not limited to the data that defines the image itself, but may be, for example, data defining the image obtained by compressing the image data or extracting the feature amount in advance.

The first display control unit 102 has a function of displaying a reference image on the display surface. The reference image according to the present embodiment may mean an image having image data that is an input parameter of an image automatic generation processing by the image control unit 16. Such reference image is displayed on the display surface of the display unit 26 of the user terminal 20.

Figure 5:
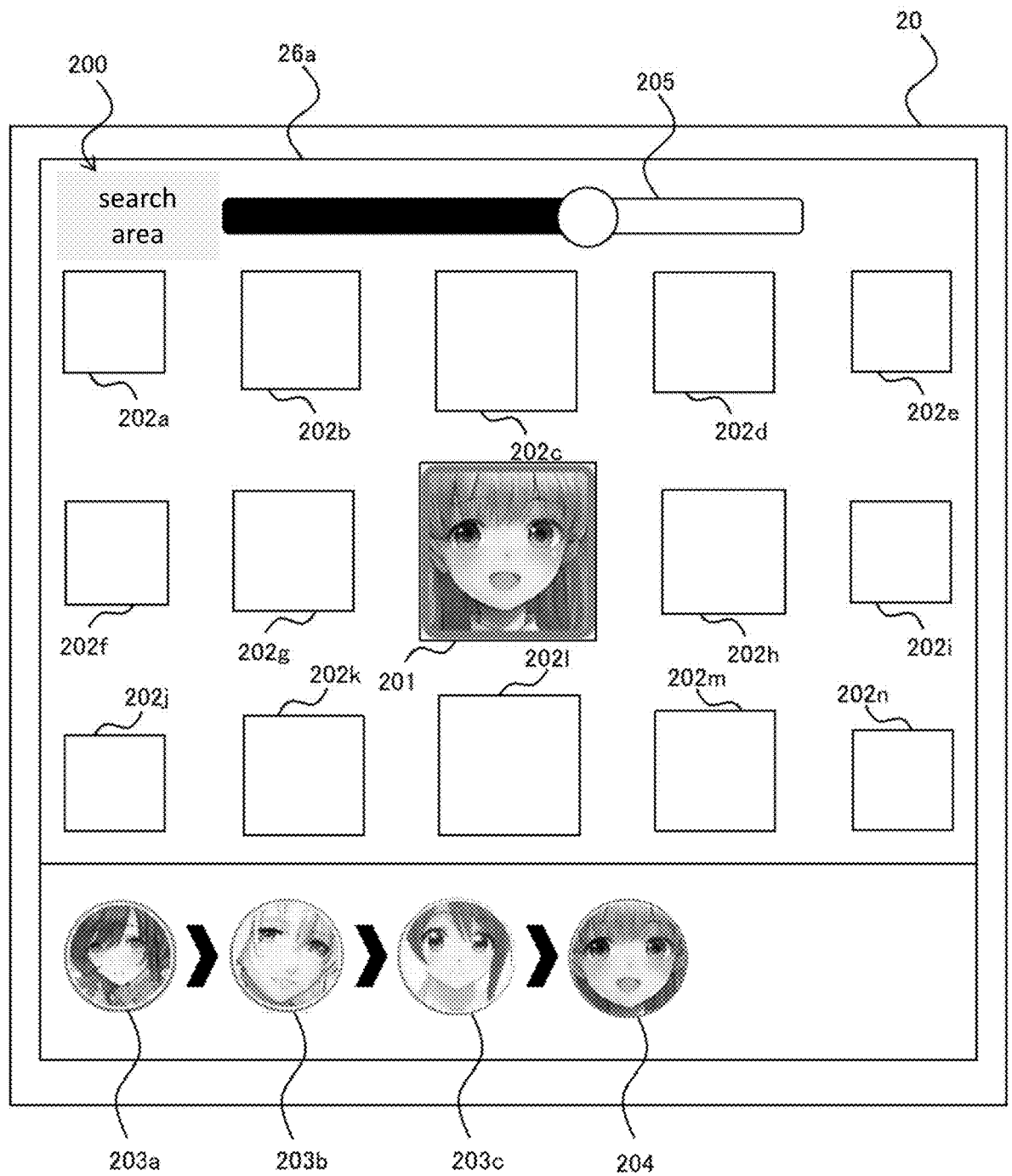
FIG. 5 is showing an example of display control by the first display control unit according to the present embodiment.

FIG. 5 is showing an example of display control by the first display control unit 102 according to the present embodiment. As shown in the figure, a screen 200 of the Web application is displayed on the display surface 26a of the user terminal 20. The reference image 201 is displayed in the central portion of the screen 200. A group of candidate images 202a to 202n are displayed at the periphery of the reference image 201. Here, the candidate image is a part or all of the images automatically generated based on the reference image 201 existing in a search range on a predetermined space described later. The predetermined space may mean, for example, a multidimensional vector space that defines image data.

Further, on the screen 200, thumbnails 203a to 203c of images selected as reference images in the past are displayed side by side in chronological order. Further, the thumbnail 204 of the current reference image 201 is displayed adjacent to the thumbnail 203c. Further, a slider bar 205 for adjusting a size of a search area described later, is displayed at the upper part of the screen 200. In addition, the slider bar 205 may not be necessarily displayed on the screen 200.

The area setting unit 103 has a function of setting a search area. The search area may mean an acquisition target area of a candidate image in a predetermined space. The image acquisition unit 101 acquires image data of the candidate image included in the search area set by the area setting unit 103.

Figure 6:
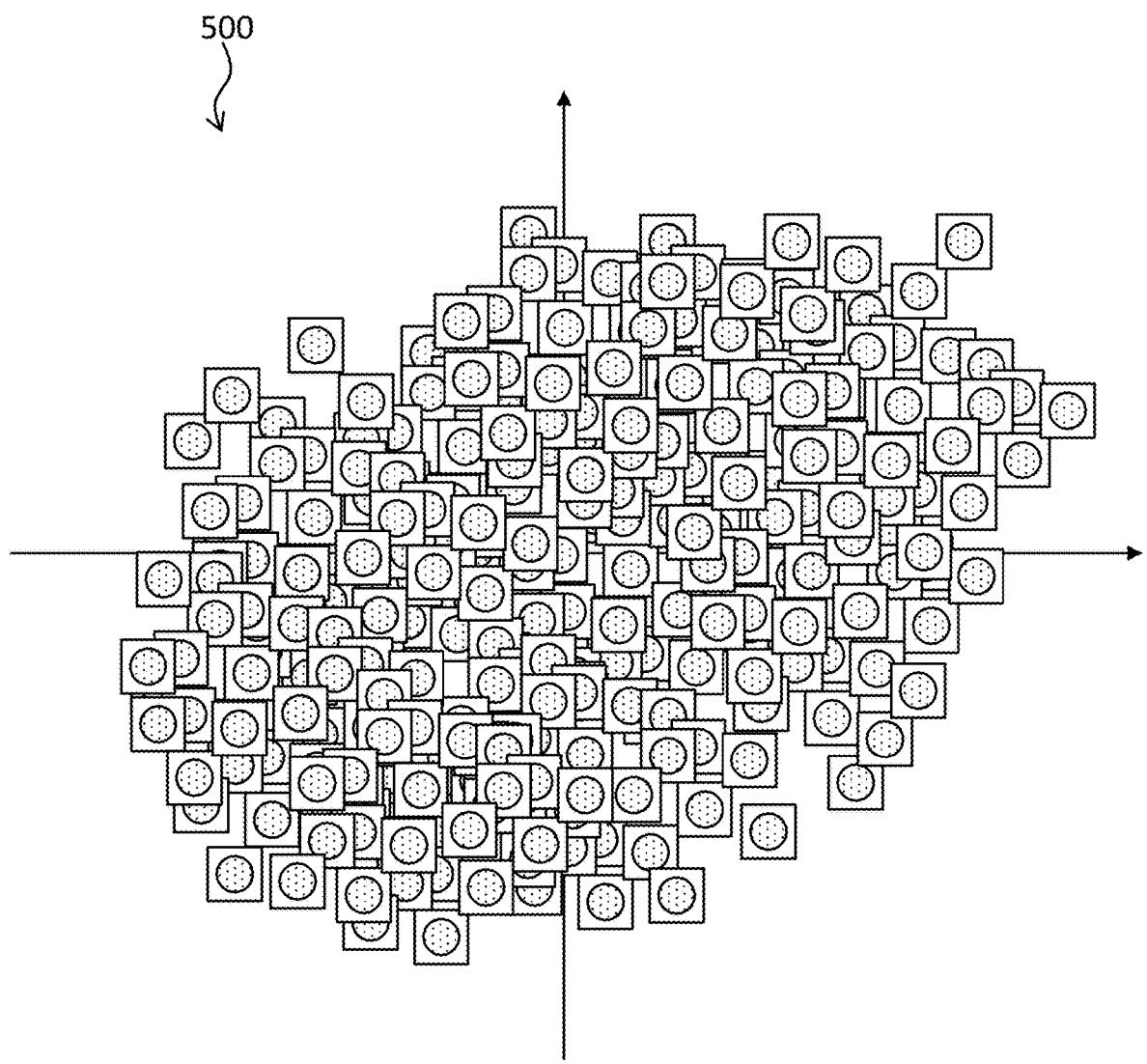
FIG. 6 is showing an example of a predetermined space and a search area according to the present embodiment.

FIG. 6 is showing an example of a predetermined space and a search area according to the present embodiment. As shown in FIG. 6, in the predetermined space 500, the image data of the image group generated in advance, or generated by the image control unit 16 is schematically mapped. This screen is called a mapping screen. The dimensionality of the predetermined space 500 is not particularly limited, but for the sake of explanation, the predetermined space 500 is represented two-dimensionally in FIGS. 6 to 8. Also in the following description, the predetermined space 500 is represented two-dimensionally.

Figure 7:
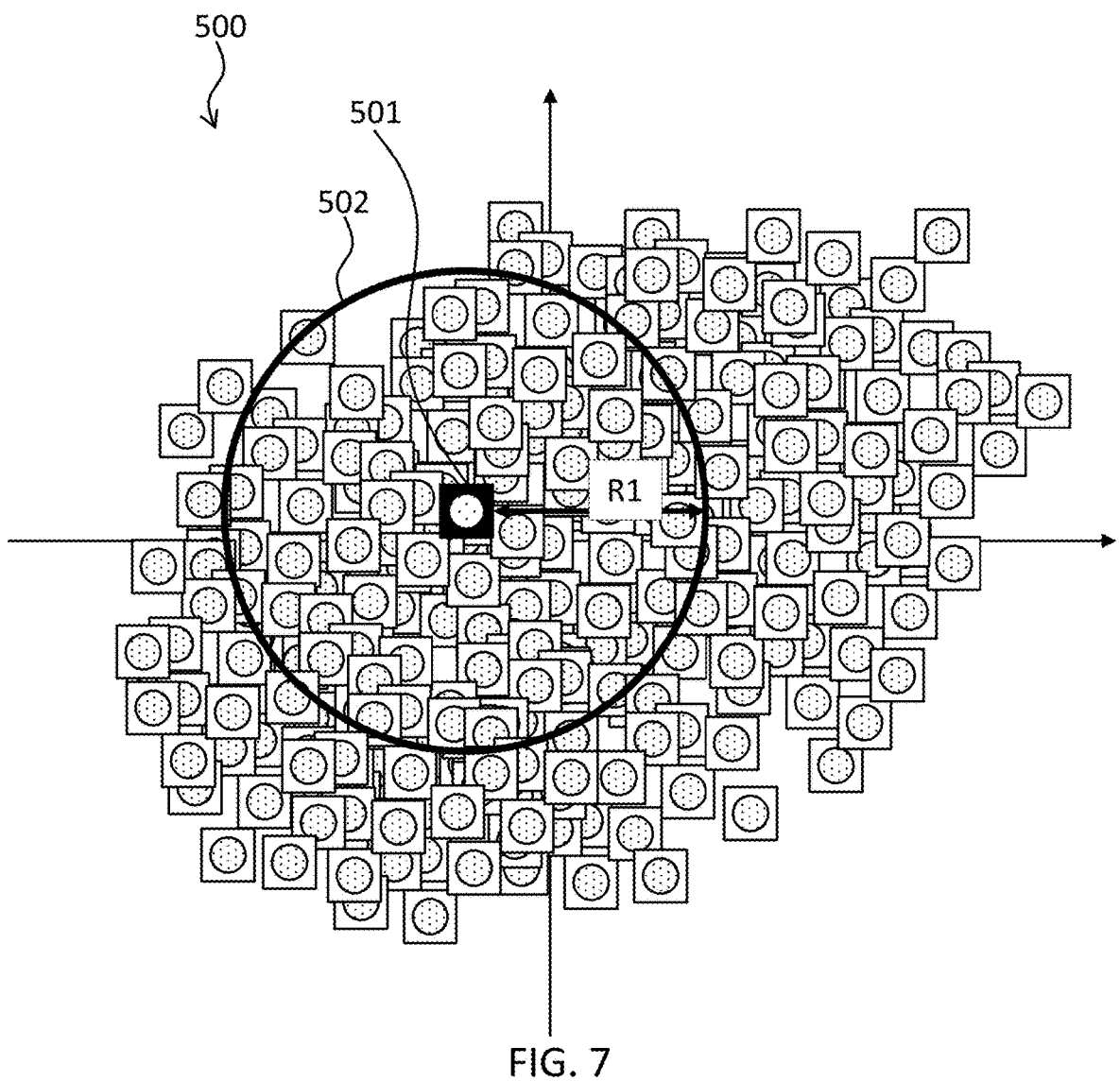
FIG. 7 is showing an example of area setting processing by the area setting unit according to the present embodiment.

FIG. 7 is showing an example of the area setting processing by the area setting unit 103 according to the present embodiment. As shown in FIG. 7, the area setting unit 103 sets an area whose distance is within R1 as a search range, centered on the coordinates of the image data of the reference image. The images included in the search area 502 herein are images having a high degree of similarity of image data to each other and having a high possibility of being relatively similar to the reference image. Also, the distance herein is, for example, Euclidean distance, Manhattan distance, Mahalanobis' generalized distance, distance specified in multidimensional space such as Earth Mover Distance, Kullback-Leibler information amount, and the type thereof is not particularly limited.

The second display control unit 104 has a function of displaying a candidate image included in the search area 502. For example, the image acquisition unit 101 acquires one or more images included in the search area 502 shown in FIG. 7 as candidate images, and the second display control unit 104 displays the acquired candidate image on the display surface 26a of the user terminal 20. At this time, the second display control unit 104 makes the display surface selectably display the candidate image at the periphery of the display area of the reference image.

Figure 8:
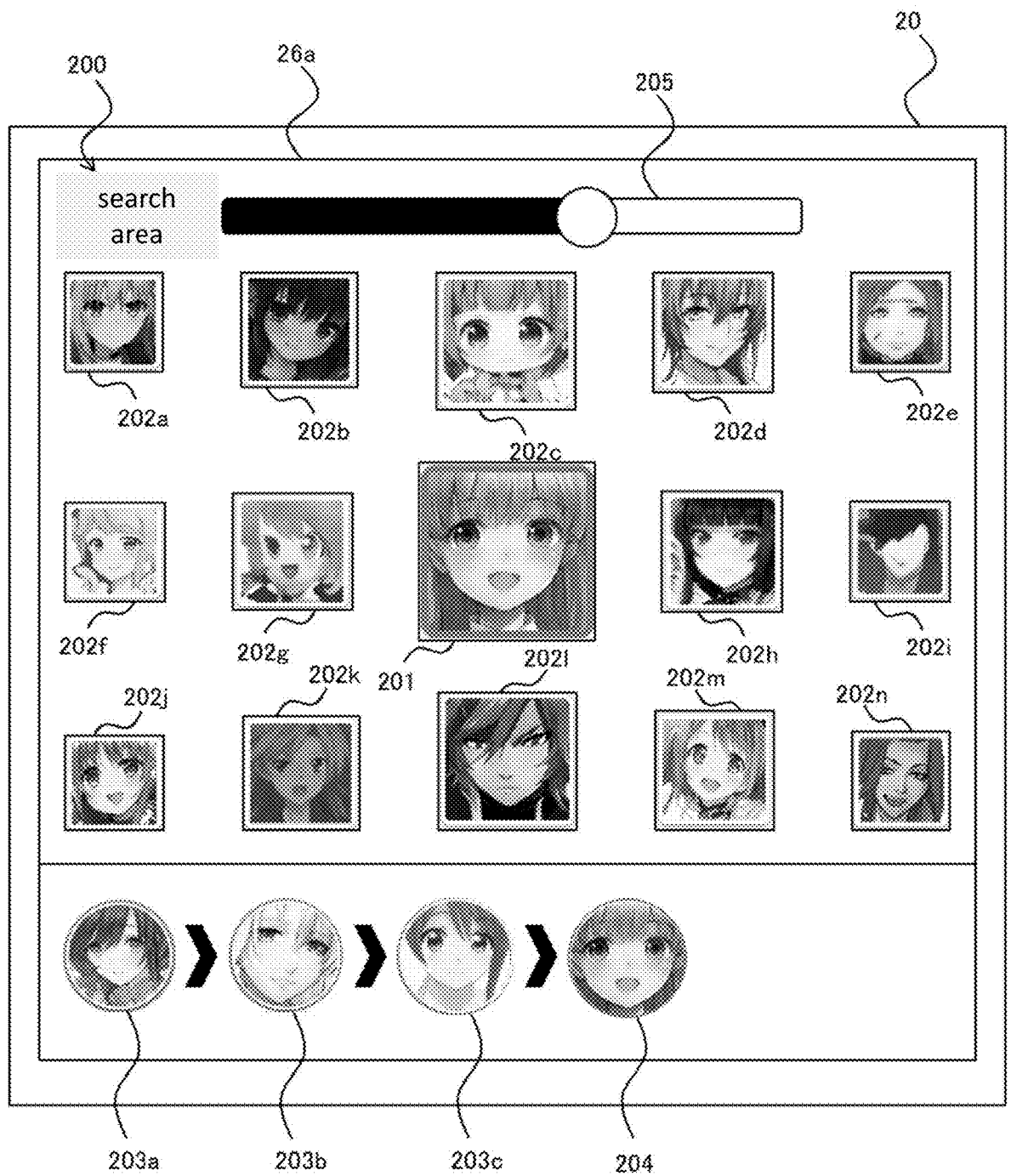
FIG. 8 is showing an example of display control by the second display control unit according to the present embodiment.

FIG. 8 is showing an example of display control by the second display control unit 104 according to the present embodiment. As shown in the figure, candidate images 202a to 202n are displayed at the periphery of the reference image 201 on the screen 200. The candidate images 202a to 202n may be selectably displayed by the operation of the user.

The display mode of these candidate images 202a to 202n is not particularly limited. For example, the second display control unit 104 may control the display mode of the candidate image 202 based on the distance between the reference image 201 and each of the candidate images 202 in a predetermined space.

The display mode herein may be, for example, a display position. Specifically, the second display control unit 104 may position the candidate image 202 and the reference image 201 on the screen 200 by matching with the length of the distance between the reference image 201 and each of the candidate images 202 in the predetermined space. That is, when the distance between the reference image 201 and the candidate image 202 is long, the second display control unit 104 displays the candidate image 202 on the screen 200 at a position away from the reference image 201, and when the distance between the reference image 201 and the candidate image 202 is short, it can display the candidate image 202 on the screen 200 at a position close to the reference image 201. Thereby, the user can intuitively grasp the degree of similarity between the reference image 201 and the candidate image 202 simply by looking at the screen 200.

In addition, the display mode may be, for example, the size on the screen 200. As shown in FIG. 8, for example, the second display control unit 104 may control the size of the display size of the candidate image 202 by matching with the length of the distance between the reference image 201 and each of the candidate images 202 in a predetermined space. Specifically, when the distance between the reference image 201 and each of the candidate images 202 in the predetermined space is short, the second display control unit 104 may increase the display size of the candidate image 202, and when the distance is long, it may reduce the display size of the candidate image 202. Thereby, the user can intuitively grasp the degree of similarity between the reference image 201 and the candidate image 202 simply by looking at the screen 200.

Further, as shown in FIG. 8, the display mode of the candidate image 202 may be adjusted by a combination of the display position and the display size. Further, in the example shown in FIG. 8, the candidate images 202 may be arranged in a grid shape, centered on the reference image 201, but for example, the candidate images 202 may be aligned on an arc, centered on the reference image 201. The candidate image 202 may be displayed in such a manner that the display positions of the reference image 201 and the group of the candidate image 202 are separated.

The operation acquisition unit 105 has a function of acquiring information related to the candidate image 202 selected based on the operation to the user terminal 20. For example, when the candidate image 202 is selected by the user's operation on the display surface 26a of the user terminal 20, the user terminal 20 transmits information related to the selected candidate image 202 to the image processing server 10. At this time, the operation acquisition unit 105 acquires the information via the transmission/reception unit 14.

Figure 9:
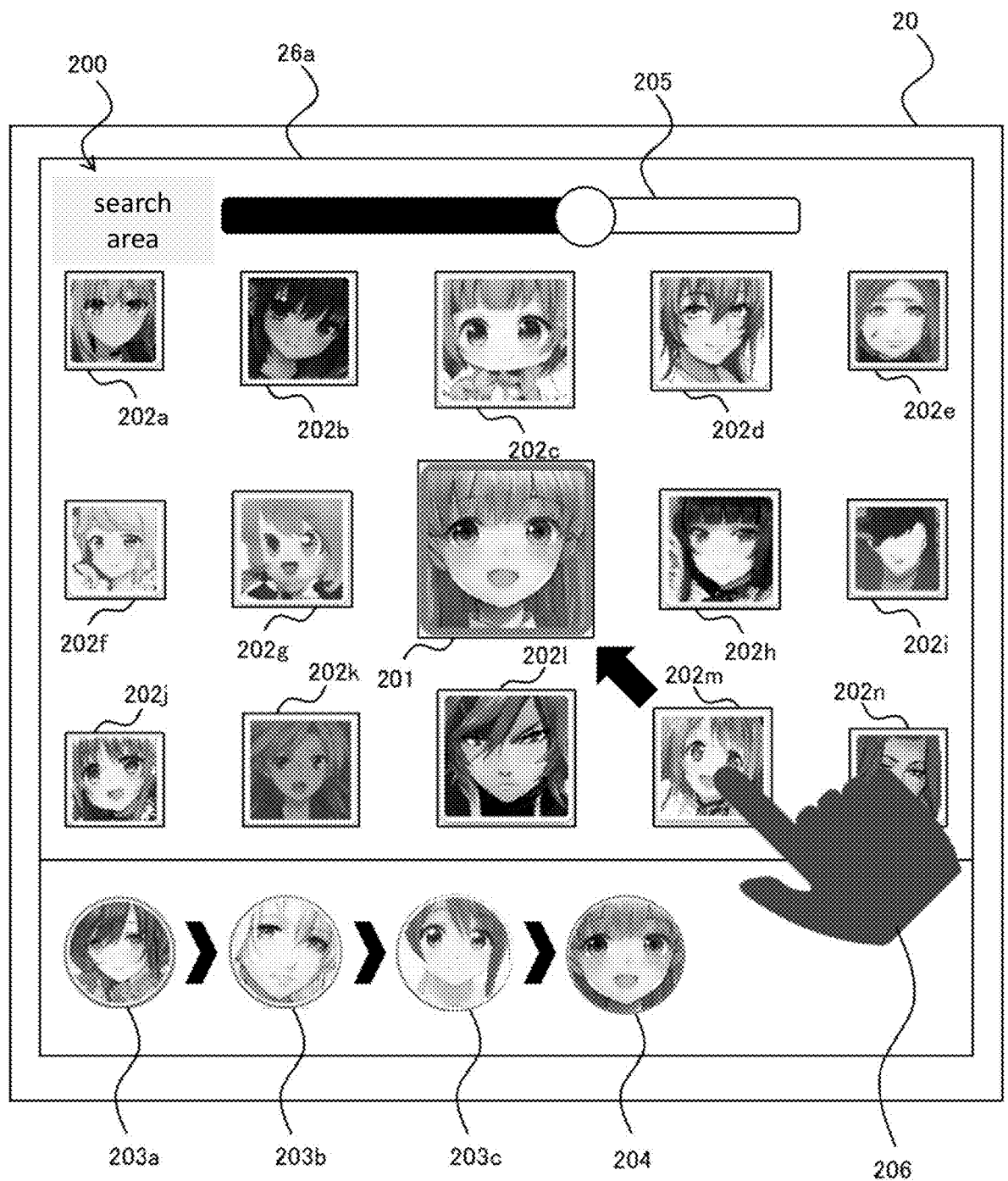
FIG. 9 is showing an example of acquisition processing by the operation acquisition unit according to the present embodiment.

FIG. 9 is showing an example of acquisition processing by the operation acquisition unit 105 according to the present embodiment. As shown in the figure, suppose that the candidate image 202m is selected in the screen 200 by the operation body 206 such as the user's hand or the like. In this case, the user terminal 20 transmits information related to the candidate image 202m selected by the operation body 206 to the image processing server 10, and the operation acquisition unit 105 acquires the information.

The operation acquisition unit 105 may acquire information related to the candidate image 202m specified by an operation such as tapping or clicking the portion of the screen 200 where the candidate image 202m is displayed. The information may be acquired by an operation (for example, a slide or flick operation) of moving the candidate image 202m with the operation body 206 toward the area where the reference image 201 is displayed. This makes it intuitive for the user as an operation of selecting the candidate image 202m as the next reference image.

Figure 10:
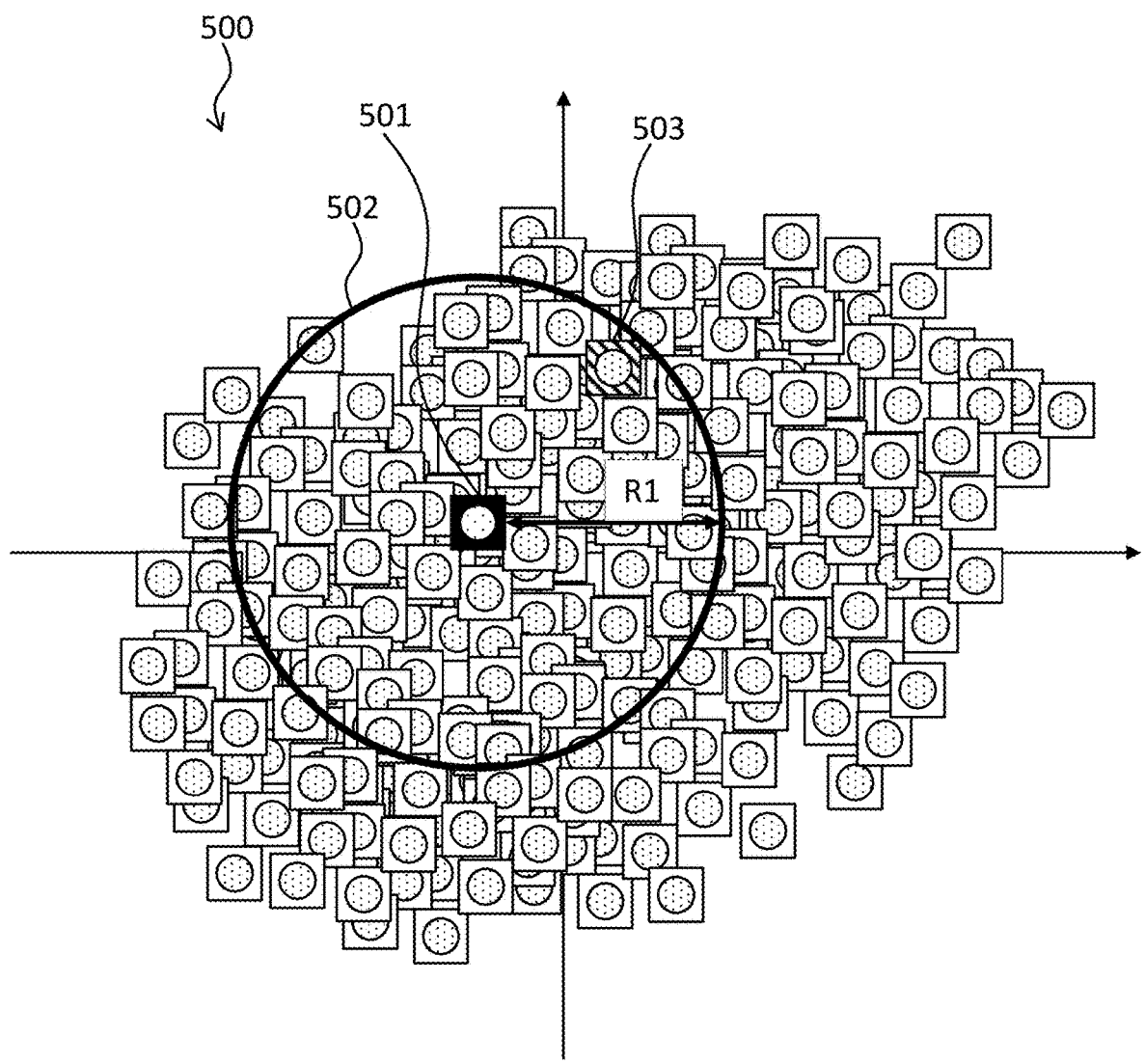
FIG. 10 is an example of a predetermined space and a search area according to the present embodiment.

FIG. 10 is showing an example of a predetermined space and a search area according to the present embodiment. As shown in the figure, in the predetermined space 500, the image data 503 of the candidate image 202m related to the information acquired by the operation acquisition unit 105 is specified. At this time, the candidate image 202m becomes the next reference image 201. The image acquisition unit 101 acquires the candidate image 202m as the reference image 201.

Figure 11:
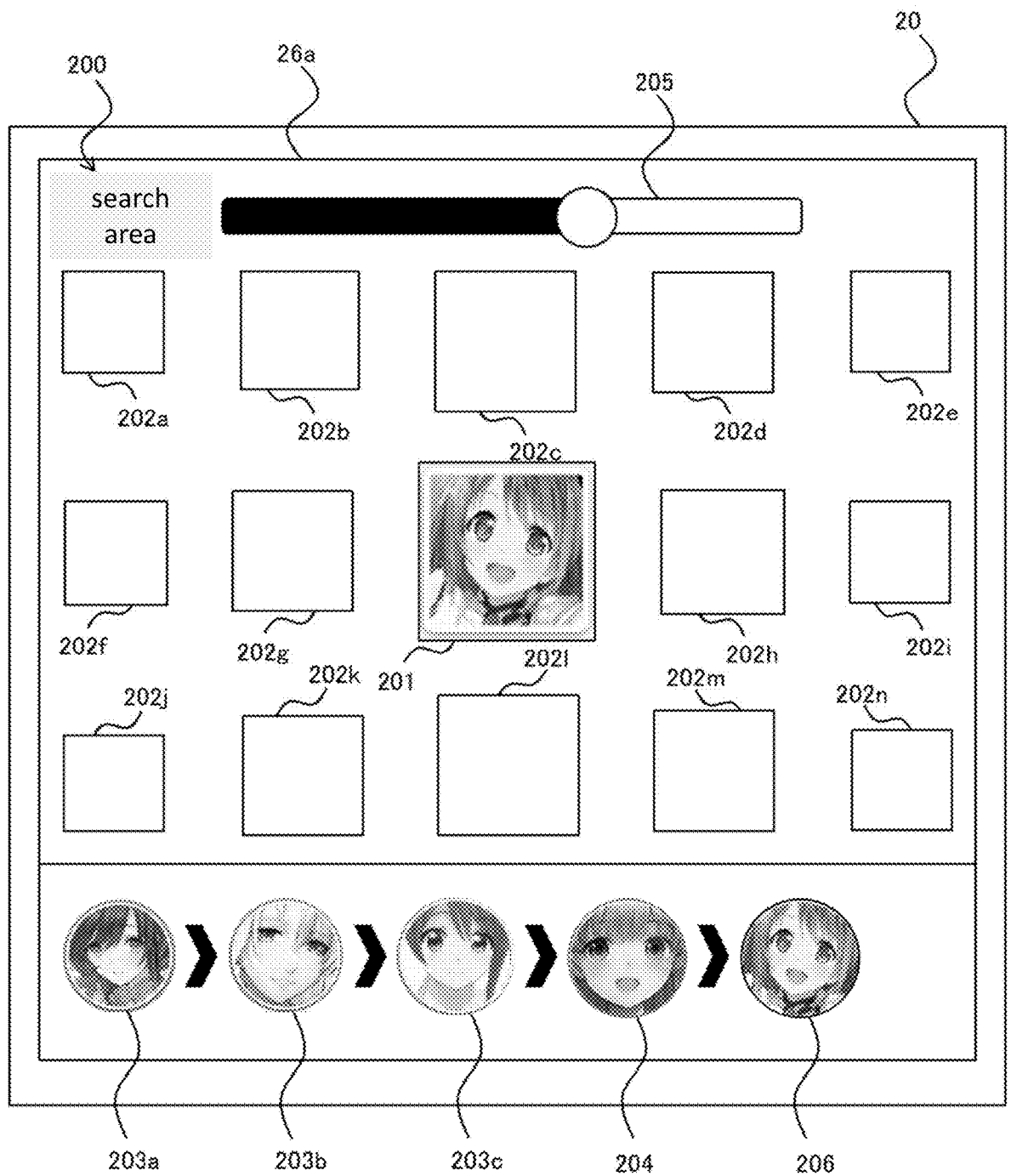
FIG. 11 is showing an example of display control processing by the first display control unit according to the present embodiment.

FIG. 11 is showing an example of display control processing by the first display control unit 102 according to the present embodiment. As shown in the figure, the first display control unit 102 displays the candidate image 202m selected in FIG. 9 as the reference image 201. At this time, as shown in FIG. 11, the candidate image 202m is displayed as a new reference image at the position previously displayed as the reference image 201. Thereby, the following processing based on the new reference image can be performed. Further, the first display control unit 102 may display the thumbnail 206 of the candidate image newly selected as the reference image 201 adjacent to the thumbnail 204 of the previous reference image.

Figure 12:
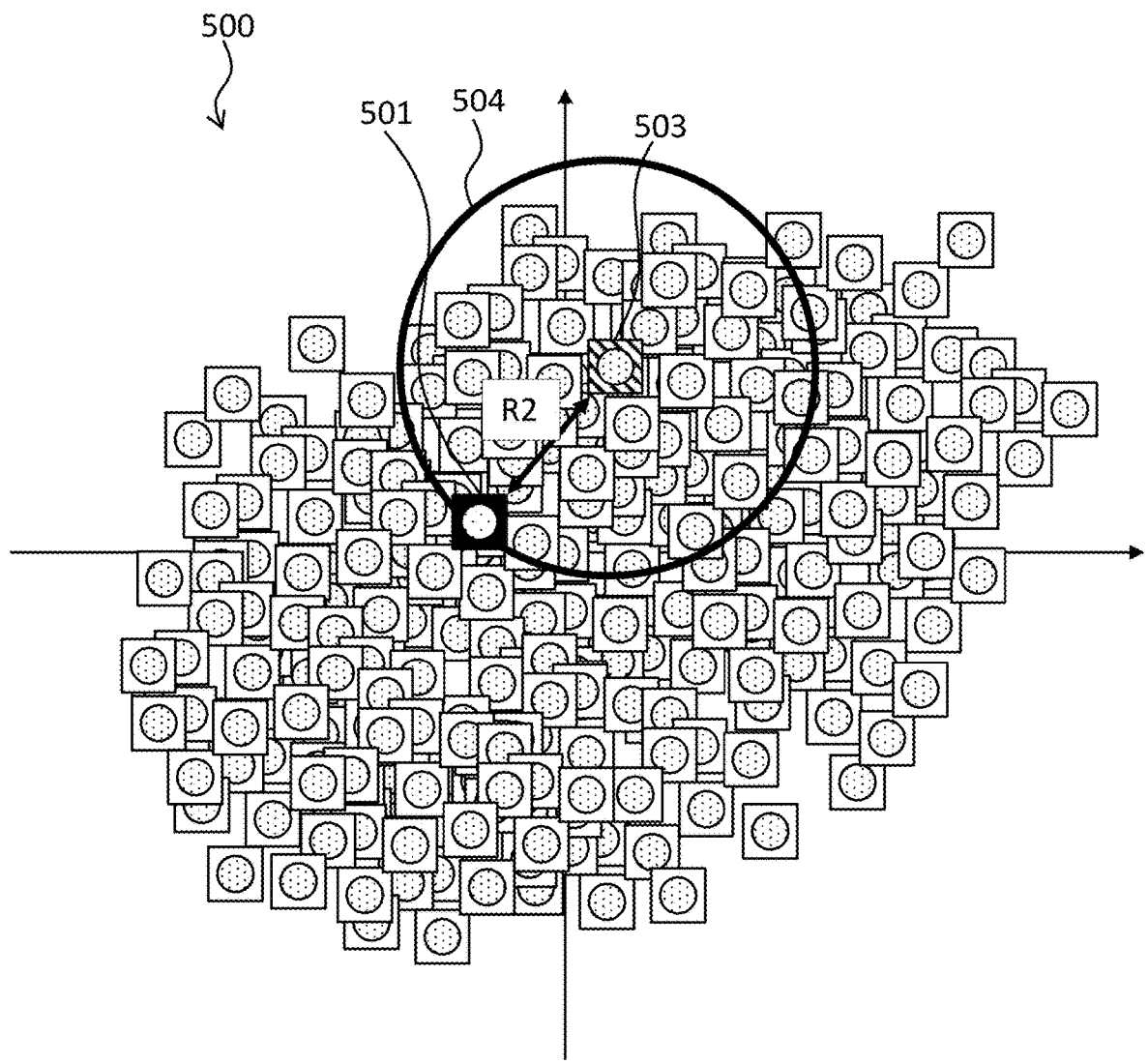
FIG. 12 is showing an example of a predetermined space and a search area according to the present embodiment.

FIG. 12 is showing an example of a predetermined space and a search areal according to the present embodiment. As shown in the figure, when the previous candidate image 202m is selected as the new reference image 201, the area setting unit 103 sets, as the search range 504, an area whose distance is within R2, centered on the coordinates of the image data 503 of the new reference image 201. In the next processing, the image having the image data included in the search area 504 is the object of the candidate image.

Further, the distance R2 from the center of the search range 504 may be the same as or different from the distance R1 from the center of the previous search range 502. For example, the distance R2 may be smaller than the distance R1. As the processing progresses, it becomes easier to generate the image desired by a user. Thus, by reducing the distance, it becomes easier to obtain a candidate image with higher accuracy. Further, the magnitude of the distance may be sequentially changed according to the progress of the processing. It may be freely selected by a slider bar 205 as shown in FIG. 11. A modified example of such a search area setting method will be described later.

By sequentially repeating the processing by the functional unit, the user selects a candidate image, and the candidate images are further narrowed down using the candidate images as new reference images. In this way, it is possible to easily search an image desired by the user simply by repeating the selection of the candidate image by the user. Although not shown in FIG. 11 and the like, when the selection by the user is completed on the screen 200 (that is, when the image finally selected as the reference image is the image desired by the user), a button or the like for completing the image search may be displayed.

The adjustment unit 106 has a function of adjusting the dimension of a predetermined space and the format of image data. The adjusting unit 106 is arbitrarily provided in the image processing server 10. When the dimension of the predetermined space that defines the image data has a certain size, the amount of calculation for searching candidate images increases. In this case, since the latency until the candidate image is displayed becomes large, user experience (UX) deteriorates, and specifications such as memory and CPU required for such calculations increase. Further, due to the so-called "curse of dimensionality", the correlation of the distance between the image data and the realization value of the image related to these image data (when the image is displayed, generally, when the distance between the image data is short, the realization value becomes close, that is, similar images are obtained) cannot be maintained. In order to avoid the negative possibility, the adjustment unit 106 has a function of adjusting the dimensionality of the predetermined space and the format of the image data.

Figure 13:
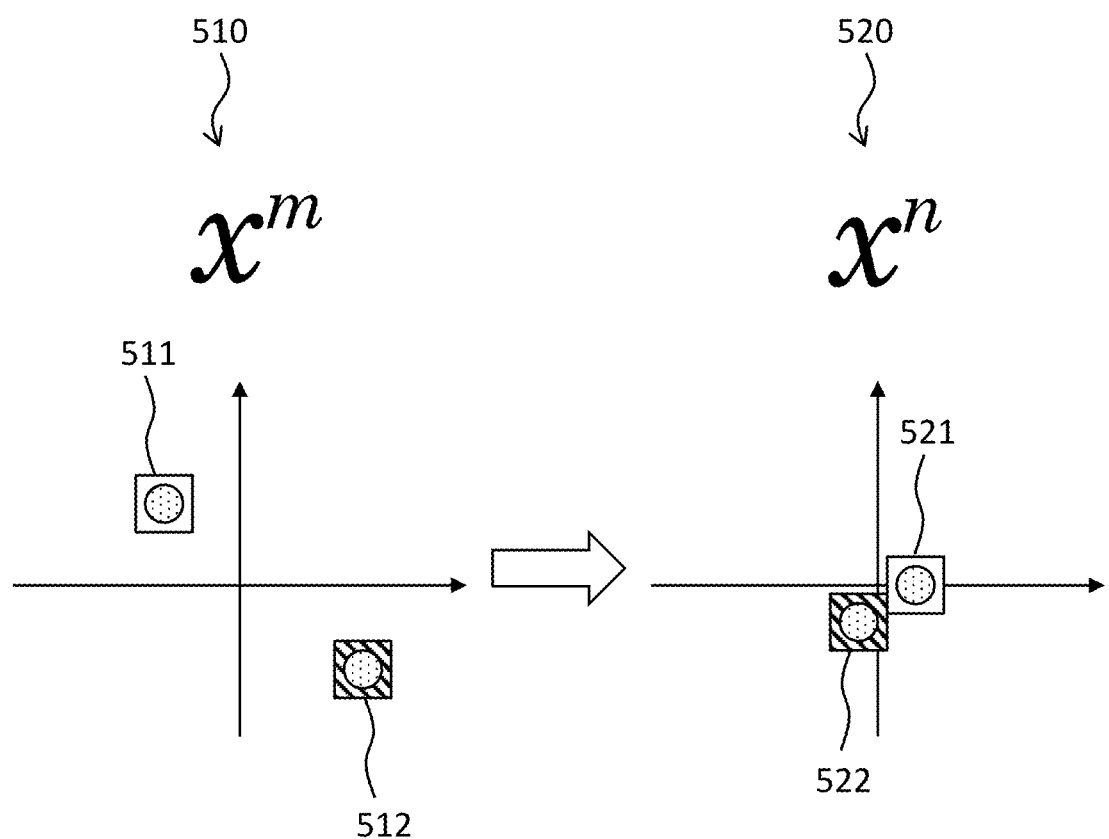
FIG. 13 is showing an example of adjustment processing by the adjustment unit according to the present embodiment.

For example, the adjustment unit 106 may adjust the dimensionality of the predetermined space that defines the image data. The dimensionality adjustment may mean, for example, an adjustment of the dimensionality of a vector or a dimension reduction. FIG. 13 is showing an example of an adjustment processing by the adjustment unit 106 according to the present embodiment. Referring to FIG. 13, before the adjustment processing by the adjustment unit 106, the image data 511 and the image data 512 are defined in the m-dimensional space 510. The image data 521 and the image data 522 are defined in the n-dimensional space 520. Here, the image data 511 and the image data 521 have corresponding image realization values, and the image data 512 and the image data 522 have corresponding image realization values. The realization values of each other are close, and the appearance of the images can be perceived to be similar. Further, the dimensionality may be m>n, but the dimensionality may be m n. That is, as will be described in detail later, new image data may be searched and generated based on the vectorized image.

As shown in FIG. 13, since the distance between the image data 511 and the image data 512 is large in the m-dimensional space 510, it is highly likely to be determined that the image data 511 and the image data 512 are not similar in analysis even if the realized values are close. Therefore, the adjustment unit 106 performs processing related to a dimension reduction and a dimensionality adjustment so as to have an appropriate dimensional space (in this case, n-dimensional space 520), whereby the n-dimensional space 520 between the image data 512 and the image data 522 can be brought close to an appropriate distance. This makes it possible to acquire a more appropriate image in the acquisition of the candidate image. As a method of a dimension reduction and a dimensionality adjustment, for example, may mean such as principal component analysis, LDA (Linear Discriminant Analysis), t-SNE (t-distributed Stochastic Neighbor Embedding) can be used. The above-mentioned processing can be performed in the space after such an adjustment processing. Further, such a processing can also be applied to image generation processing, and for example, when learning a learning model used in an image generation processing, learning can be performed in consideration of the above processing.

Further, the adjustment unit 106 may vectorize the image data acquired by the image acquisition unit 101 by various methods. For example, the adjustment unit 106 may reduce the dimension of high-dimensional image data. If the image data is not vector data, the adjustment unit 106 may appropriately vectorize the image data. The vectorization of image data is not particularly limited. For example, statistical analysis means such as principal component analysis, LDA (Linear Discriminant Analysis), t-SNE (t-distributed Stochastic Neighbor Embedding) may be used. A method of vectorization by using a Classifier such as Encoder-Decoder, AutoEncoder, StyleTransfer, VGG, and the like for feature extraction and learning the part to be vectorized at the same time as image generation during model training can be used. Further, the adjustment unit 106 generates vector data close to the image data reduced in dimension by vectorization, and new image data can be generated from such vector data. By making image data compression reversible in this way, low-dimensional vector data can be used for the search of the image, and when the image is actually acquired, such vector data can be made high-dimensional. Thereby, a desired image can be obtained as high-definition data while lightening the processing in the image search.

Further, the adjustment unit 106 may adjust the size of the selection object group according to the processing status of the image display system 1 in the search area set by the area setting unit 103. Here, the selection object group may mean a group in which the target to be displayed on the screen 200 is limited in advance according to the processing status among the group of candidate images included in the search area. The second display control unit 104 may display the candidate image included in the selection object group on the display surface 26a.

Figure 14:
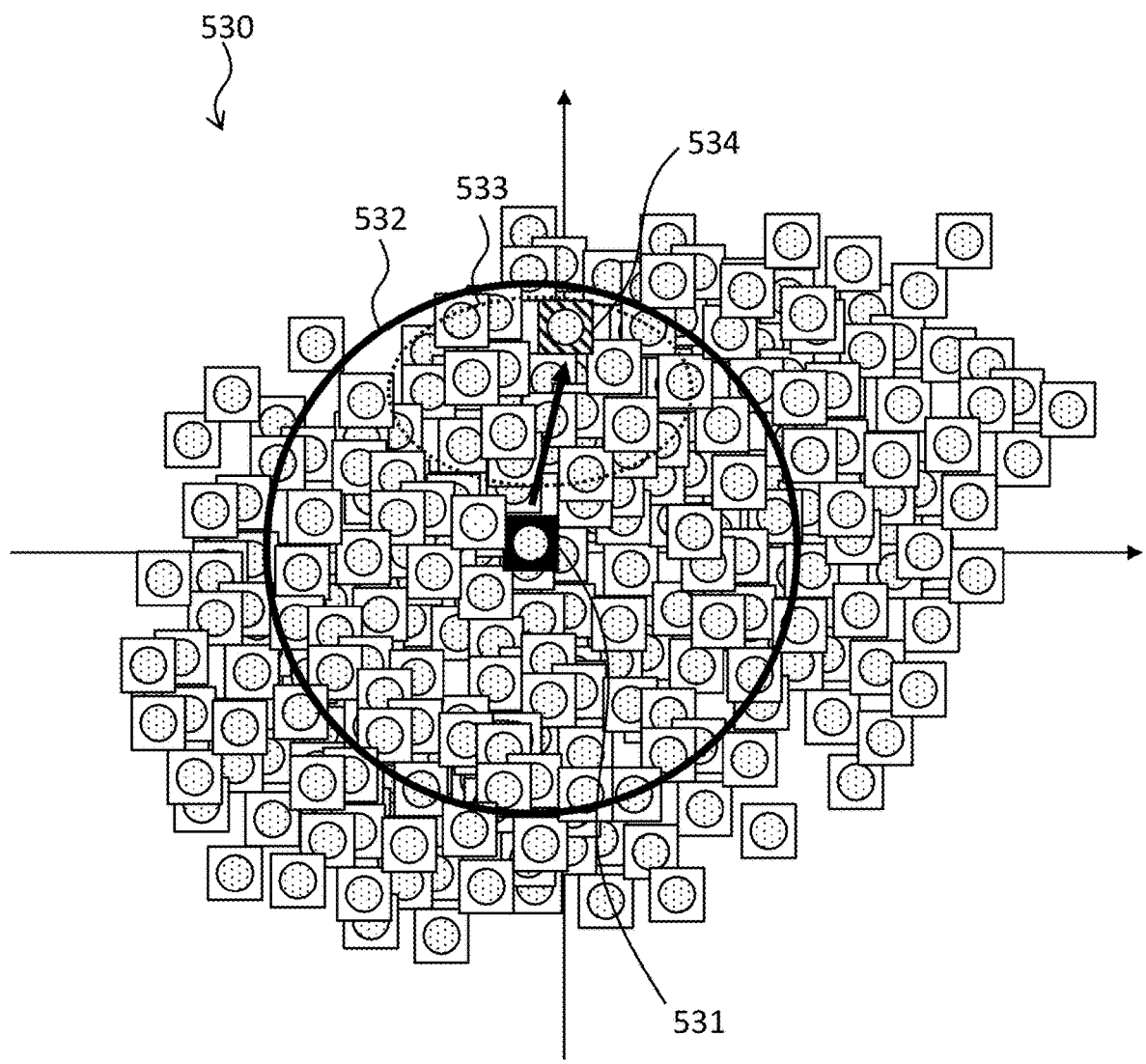
FIG. 14 is showing an example of processing related to adjustment of a group to be selected by the adjustment unit according to the present embodiment.
Figure 15:
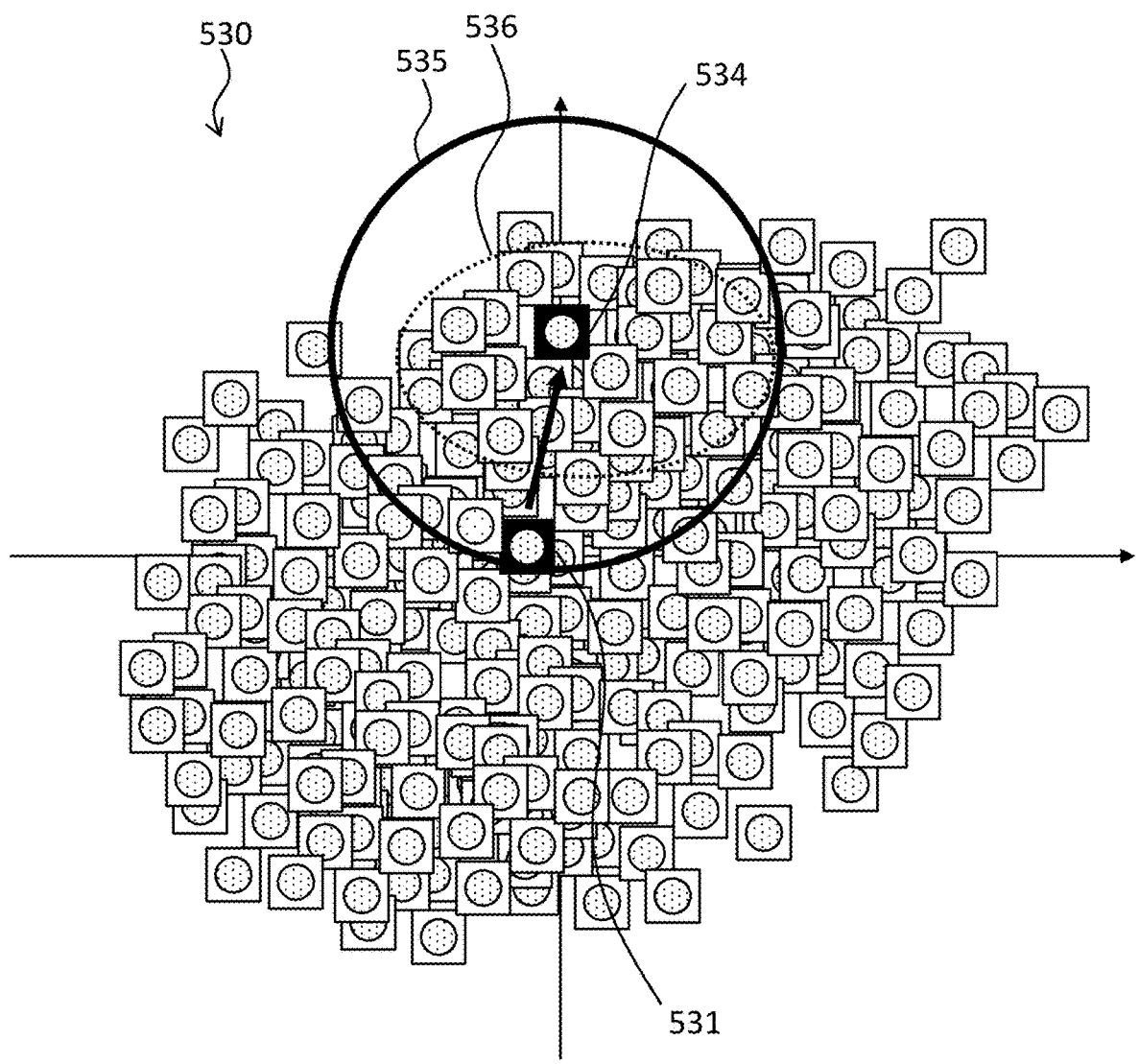
FIG. 15 is showing an example of processing related to adjustment of a selection object group by the adjustment unit according to the present embodiment.

FIGS. 14 and 15 are showing examples of processing related to the adjustment of the selection object group by the adjustment unit 106 according to the present embodiment. FIG. 14 is related to the former processing, and FIG. 15 is related to the latter processing. As shown in FIG. 14, in the former processing, the search area 532 is set in the predetermined space 530 with reference to the image data 531 related to the reference image. On the other hand, as shown in FIG. 15, in the subsequent processing, the search range 535 is set in the predetermined space 530 based on the image data 534 related to the new reference image. At this time, the search range 532 is wider than the search range 535.

In the former processing, the search range is widened in order to increase the diversity of candidate images, while the accuracy may not be high. Rather, when trying to maintain accuracy, the processing load increases because the search range is wide. Therefore, the adjustment unit 106 adjusts the selection object group that is the target of the candidate image inside the search range. The size of the selection object group is set to be relatively small. Further, in the example shown in FIG. 14, for the sake of explanation, a region near a predetermined coordinate is set as a selection object group. For example, the adjustment unit 106 may set a plurality of selection object groups based on a plurality of positions. In this way, the target of the candidate image can be processed at high speed in the initial processing by narrowing the size of the selection object group to be small.

On the other hand, in the latter processing shown in FIG. 15, selection by the user is sequentially proceeded. Therefore, the adjustment unit 106 can set the size of the selection object group to be relatively large, or can adjust the entire search area as the selection object group. Therefore, it is possible to select an image with high accuracy according to the user's intention. Conversely, the adjustment unit 106 may reduce the size of the selection object group as the processing progresses.

The functions of the software configuration of the control unit 11 have been described above.

Next, a modified example of the area setting processing by the area setting unit 103 will be described. The area setting unit 103 sets the search area based on the image data of the reference image 201. At that time, the position and size of the search area are not limited to the above-mentioned setting method.

Figure 16:
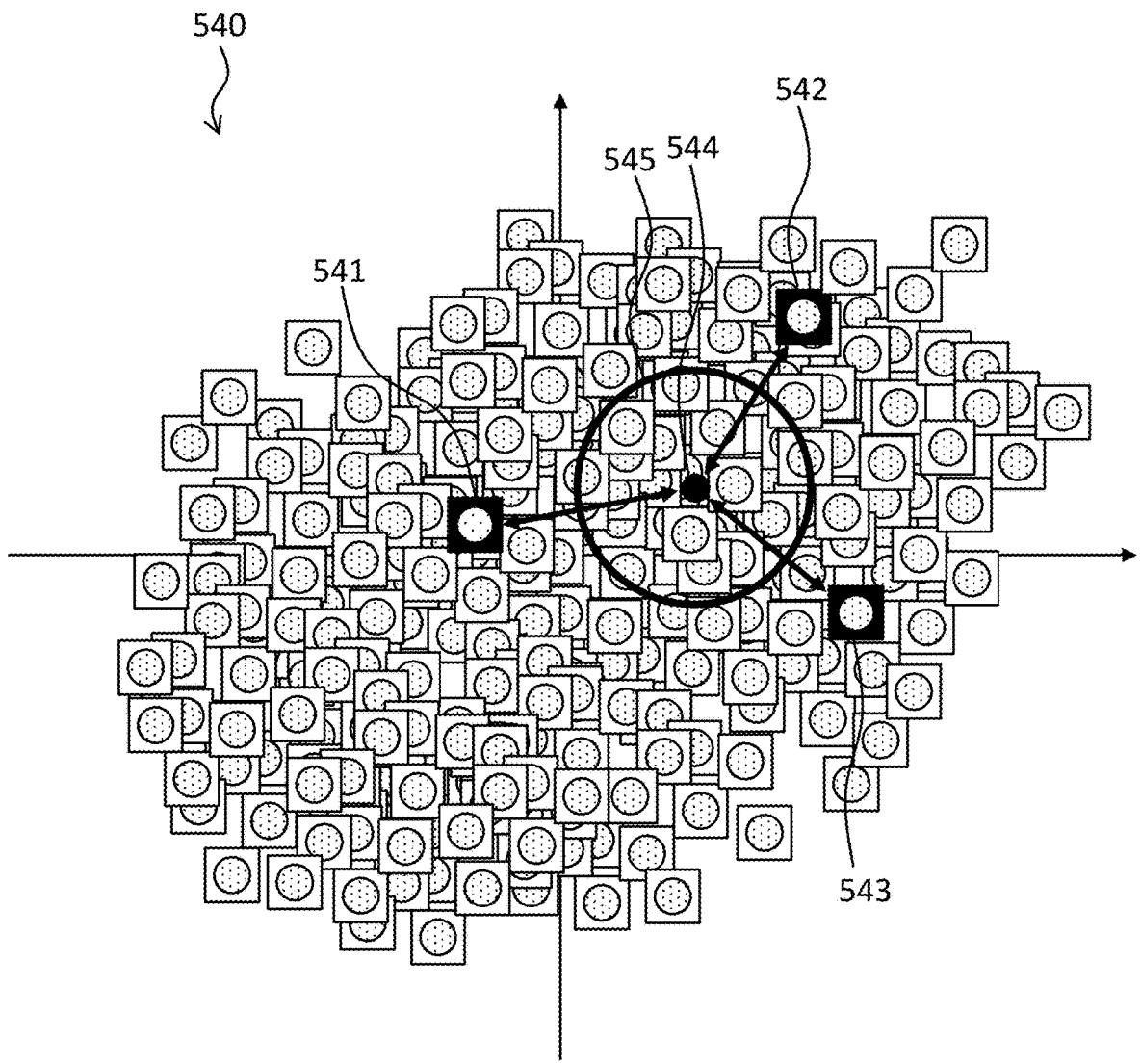
FIG. 16 is showing an example of a search area setting processing by the area setting unit according to a modified example of the present embodiment.

FIG. 16 is showing an example of a search area setting processing by the area setting unit 103 according to a modified example of the present embodiment. As shown in the figure, the image group exists in the predetermined space 540. Suppose the images related to the image data 541, 542, 543 are selected as the reference images by the past processing by the image display system 1. In this case, the area setting unit 103 may set the search area based on the image data 541 to 543. For example, the area setting unit 103 may set the search area 545 based on the position of the geometric center 544 such as the gravity center of the image data 541 to 543 or the position of geometric center like a center.

Figure 17:
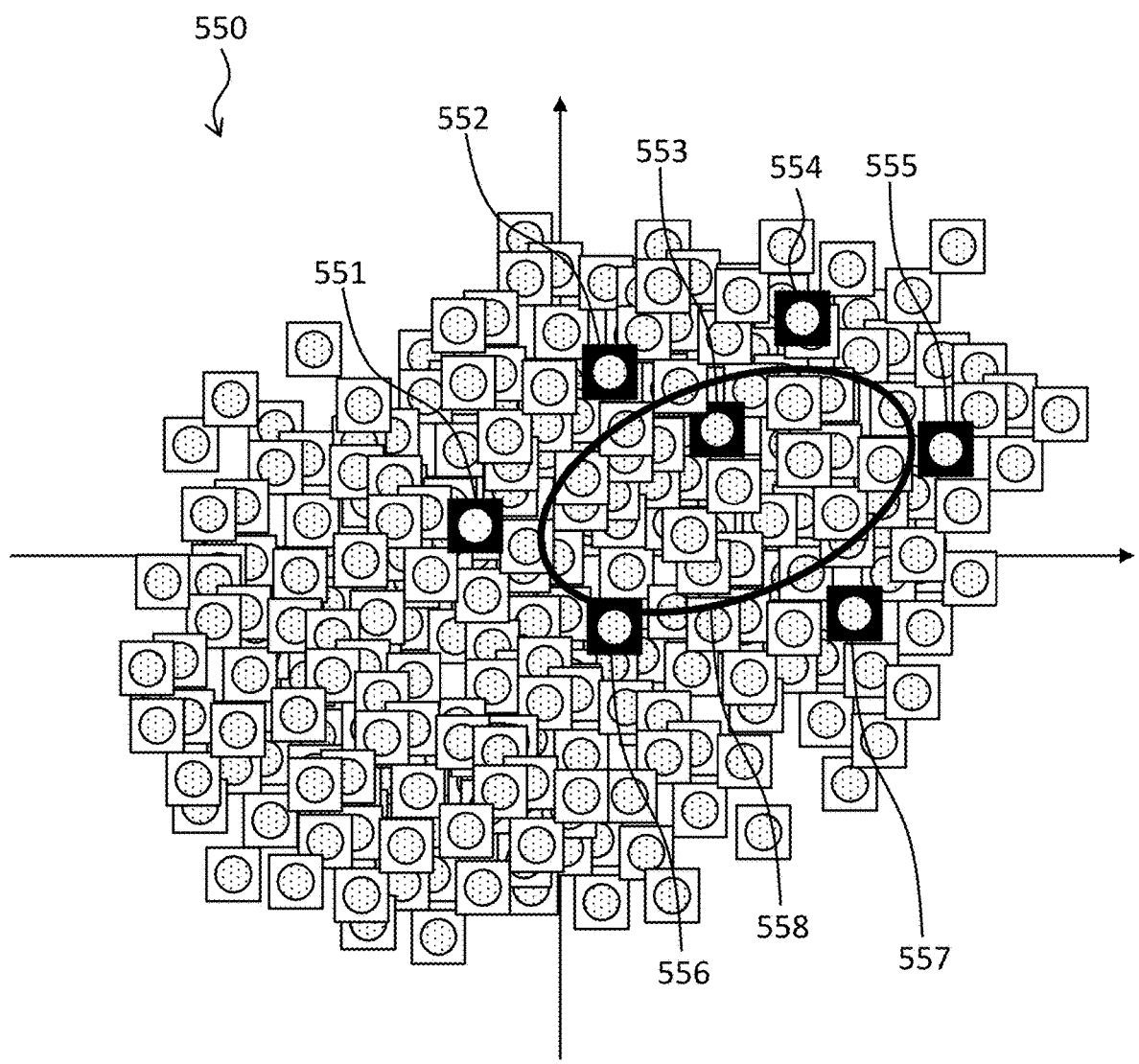
FIG. 17 is showing an example of a search area setting processing by the area setting unit according to a modified example of the present embodiment.

FIG. 17 is showing an example of a search area setting processing by the area setting unit 103 according to a modified example of the present embodiment. As shown in the figure, the image group exists in the predetermined space 550. Suppose the images related to the image data 551 to 557 are selected as the reference images by the previous processing by the image display system 1. In this case, the area setting unit 103 may set the search area based on the distributions of the image data 551 to 557. For example, the area setting unit 103 can perform statistical processing on the image data 551 to 557 and set the search area 558 based on the statistical values such as the average value and the variance.

Figure 18:
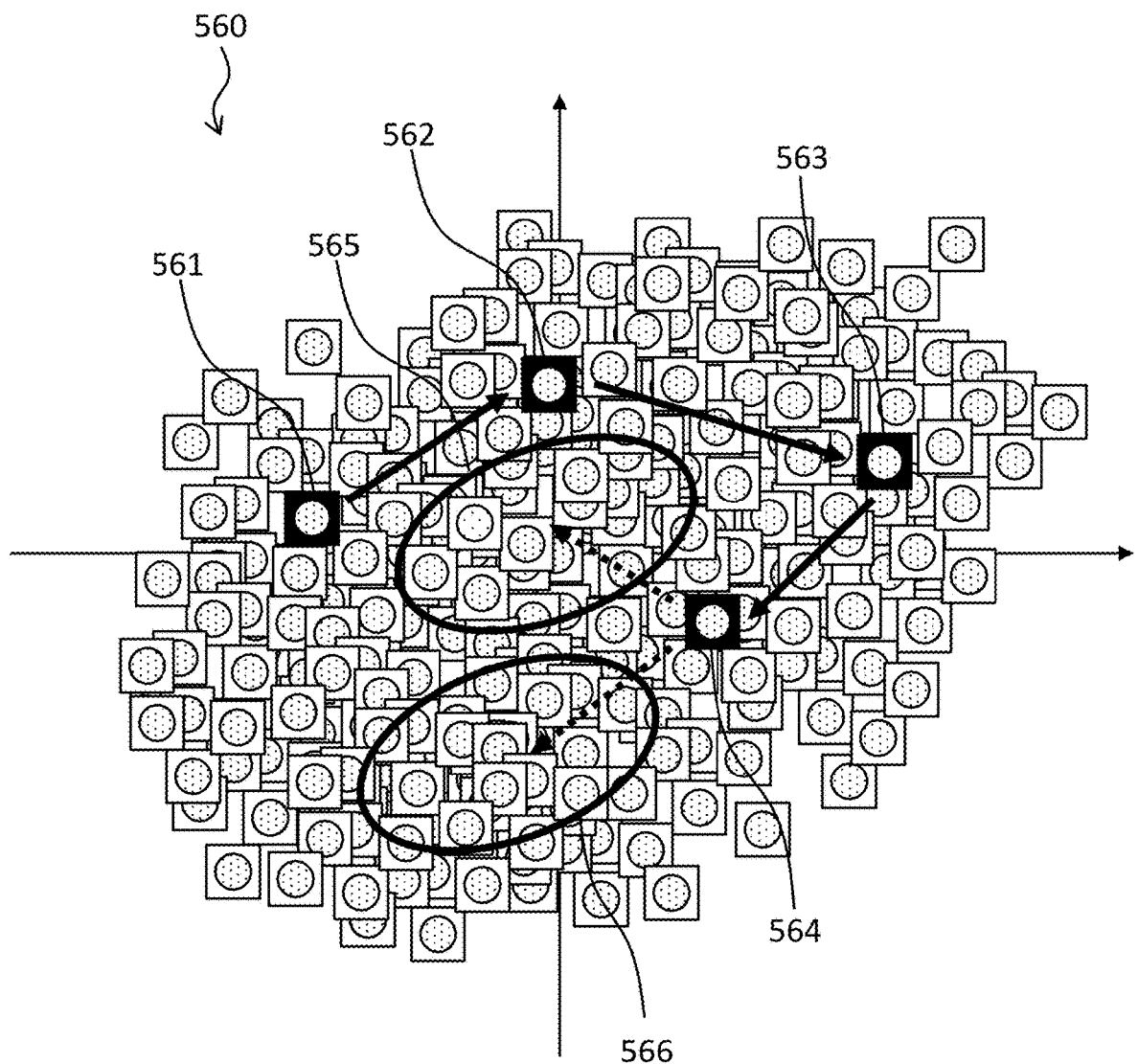
FIG. 18 is showing an example of a search area setting processing by the area setting unit according to a modified example of the present embodiment.

FIG. 18 is showing an example of a search area setting processing by the area setting unit 103 according to a modified example of the present embodiment. As shown in the figure, the image group exists in the predetermined space 560. Suppose the images related to the image data 561, 562, 563, 564 are selected as the reference images by the previous processing by the image display system 1. In a series of repetitive processing, the image data 561, 562, 563, and 564 is selected as the reference image in this order.

In this case, the area setting unit 103 may set the search area based on the transition of selection of the image data 561 to 564 as the reference image. As shown in the figure, for example, the area setting unit 103 may set the area centered on the portion that is weighted center of gravity of the transition of the image data 561 as the search area 565 when the image related to the image data 564 is selected as the reference image. As a result, the area where the user's desired image seems to exist can be derived from the past transition, so that the search efficiency can be improved. By changing the weighting method (for example, increasing the weight to the image data related to the reference image selected in the immediately preceding process), the area setting unit 103 may set the search area 566.

Further, the area setting unit 103 may manually set and adjust the search area by manipulating a slider bar 205 displayed on the screen 200 shown in FIG. 8. In addition, the area setting unit 103 displays the screen of the image group mapped to the predetermined space 500 as shown in FIG. 6 on the display surface 26a. The search area may be set based on the operation of the user on the screen.

The modification of the search area setting processing by the area setting unit 103 has been described above.

Figure 19:
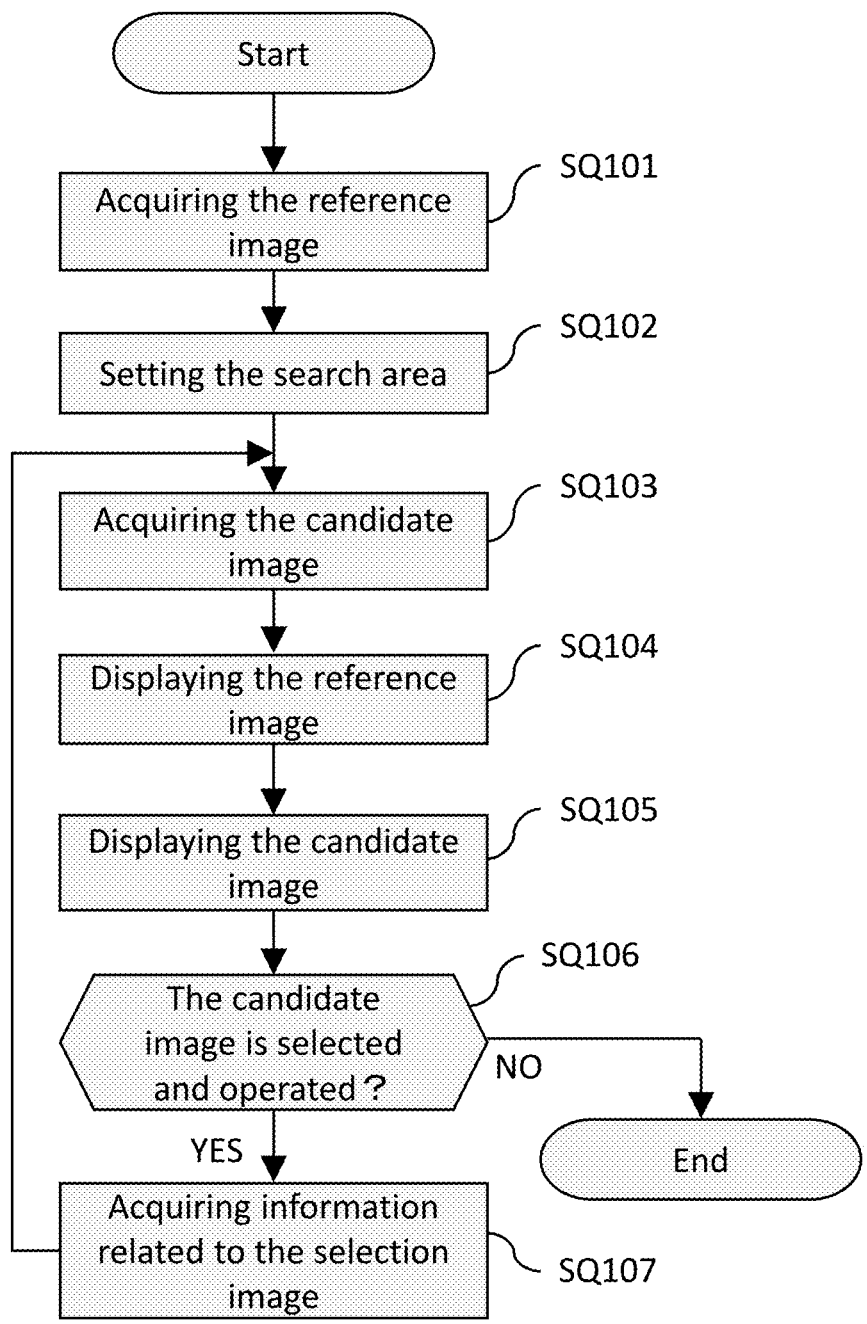
FIG. 19 is a flowchart showing a flow of processing executed by the image display system of the present embodiment.

FIG. 19 is a flowchart showing a flow of processing executed by the image display system 1 of the present embodiment. First, the image acquisition unit 101 acquires the image data of the reference image (SQ101). Next, the area setting unit 103 sets a search area in a predetermined space based on the image data of the reference image (SQ102). Next, the image acquisition unit 101 acquires image data of the candidate image included in the search area (SQ103).

Next, the first display control unit 102 performs a process of displaying the reference image on the display surface (SQ104). Further, the second display control unit 104 performs a process of displaying the candidate image on the display surface (SQ105). Next, when one of the candidate images is selected (SQ106/YES) by the user's operation on the display surface 26a of the user terminal 20 (SQ106/YES), the operation acquisition unit 105 acquires information related to the selected candidate image. (SQ107). On the other hand, when the candidate image is not selected by the user's operation on the display surface 26a (for example, when the button to complete the process is selected) (SQ106/NO), the processing by the image display system 1 is terminated.

The embodiments of the present disclosure may include, for example, the above-mentioned electronic devices, systems, methods of executing it on the electronic devices or the systems, programs for making electronic devices operate, and a non-temporary tangible medium on which the program is recorded.

Preferred embodiments of the present disclosure have been described above in detail with reference to the accompanying drawings, but the technical scope of the present disclosure is not limited to these embodiments. It will be obvious to anyone with ordinary knowledge in the technical field of the present disclosure that various changes and modifications can be conceived within the scope of the technical ideas set forth in the appended claims, and it will be understood that these also naturally belong to the technical scope of the present disclosure.

For example, in the above embodiments, the image display system 1 is composed of an image processing server 10 and a user terminal 20, but the present disclosure is not limited to these embodiments. For example, in another embodiment, the image display system 1 may be configured only by the user terminal 20. In this case, the functions of the image processing server 10 can be realized by various hardware provided in the user terminal 20.

Further, each step in the above embodiments does not need to be necessarily processed in chronological order in the order described as the flowchart. For example, each step in the processing of the above embodiment may be processed in an order different from the order described in the flowchart, or may be processed in parallel.

Further, the effects described herein are merely explanatory or exemplary and are not limited. That is, the technique according to the present disclosure may exert other effects apparent to those skilled in the art from the description of the present specification, in addition to or in place of the above effects.

EXPLANATION OF SYMBOLS 1 image display system
10 image processing server
11 control unit
15 image control unit
16 image memory
20 user terminal
26 display unit
26a display surface
101 image acquisition unit
102 first display control unit
103 area setting unit
104 second display control unit
105 operation acquisition unit
106 adjustment unit

The invention claimed is:
1. An image display system for automatically generating an image desired by a user, the system comprising:
 a first display control unit that displays a reference image on a display surface; and
 a second display control unit that selectably displays a plurality of candidate images, each having image information different from that of the reference image, in the periphery of the display area of the reference image on the display surface, wherein each image data of the plurality of candidate images is generated based on the image data of the reference image and, wherein each image data of the plurality of candidate images is included in a search area on a predetermined space determined based on the image data of the reference image, which is the area having a size smaller than the predetermined space related to the image group, wherein the first display control unit displays the selected one image as the reference image when a selection of one image among the plurality of candidate images displayed on the display surface is input, and wherein the second display control unit displays each of the new plurality of candidate images for the image data acquired from the new search area determined based on the image data of the previous reference image and the image data of the selected new reference image, wherein the search area is set based on a distribution on the predetermined space of image data of the plurality of images previously selected as the reference image.

2. The image display system according to claim 1, wherein the search area is determined based on the information related to the position of the image data of the reference image in the predetermined space, wherein the image data is vectorized, and wherein the second display control unit displays each of the images generated from each of the image data included in the search area and each of the vectorized image data as each of the candidate images.

3. The image display system according to claim 1, wherein the first display control unit displays the selected one image as the reference image in the area where the reference image is displayed.

4. The image display system according to claim 3, wherein input of selection of one image among the plurality of candidate images is an input based on a movement of an operation body on the display surface toward an area where the reference image of the one image is displayed.

5. The image display system according to claim 1, wherein the search area is set based on the distance between the image data of the reference image and the image data of the image previously selected as the reference image.

6. The image display system according to claim 5, wherein the search area is set based on the distance between the image data of the reference image and the image data of a plurality of images previously selected as the reference image.

7. The image display system according to claim 1, wherein the search area is set based on a transition on the predetermined space of image data of the plurality of images previously selected as the reference image.

8. The image display system according to claim 1, wherein the search area is set based on an operation to a mapping screen of image data of an image group on the predetermined space displayed on the display surface.

9. The image display system according to claim 1, wherein the predetermined space is a space obtained by subjecting the coordinate space of the image data of the image to a dimension reduction processing or a dimensionality adjustment processing.

10. The image display system according to claim 1, wherein the second display control unit controls the display mode of each of the plurality of candidate images on the display surface based on the distance in the predetermined space between the reference image and each of the plurality of candidate images.

11. The image display system according to claim 10, wherein the second display control unit controls the display size of each of the plurality of candidate images on the display surface based on the distance in the predetermined space between the reference image and each of the plurality of candidate images.

12. The image display system according to claim 10, wherein the second display control unit determines the display position of each of the plurality of candidate images on the display surface based on the distance between the reference image and each of the plurality of candidate images in the predetermined space.

13. The image display system according to claim 12, wherein the second display control unit determines the distance on the display surface between each of the plurality of candidate images and the reference image based on the distance in the predetermined space between the reference image and each of the plurality of candidate.

14. The image display system according to claim 1, wherein the second display control unit displays the candidate image selected from the selection object group having a size set according to the processing status of the image display system in the search area.

15. The image display system according to claim 1, wherein the size of the selection object group for the search area increases or decreases as the processing of the image display system progresses.

16. The image display system according to claim 1, wherein the second display control unit displays the plurality of candidate images having image data included in a new search area based on the input to an area change object that changes the size of the search range displayed on the display surface.

* * * * *